(12) United States Patent
Ryu et al.

(10) Patent No.: US 12,041,505 B2
(45) Date of Patent: Jul. 16, 2024

(54) METHOD FOR MANAGING PDU SESSION IN WIRELESS COMMUNICATION SYSTEM AND APPARATUS THEREFOR

(71) Applicant: LG ELECTRONICS INC., Seoul (KR)

(72) Inventors: Jinsook Ryu, Seoul (KR); Laeyoung Kim, Seoul (KR); Hyunsook Kim, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/850,308

(22) Filed: Jun. 27, 2022

(65) Prior Publication Data

US 2022/0338084 A1 Oct. 20, 2022

Related U.S. Application Data

(63) Continuation of application No. 16/065,120, filed as application No. PCT/KR2018/000438 on Jan. 9, 2018, now Pat. No. 11,523,319.

(Continued)

(51) Int. Cl.
*H04W 76/12* (2018.01)
*H04W 36/14* (2009.01)

(52) U.S. Cl.
CPC ........... *H04W 36/14* (2013.01); *H04W 76/12* (2018.02)

(58) Field of Classification Search
CPC . H04W 36/14; H04W 76/12; H04W 36/0011; H04W 76/11
See application file for complete search history.

(56) References Cited

U.S. PATENT DOCUMENTS

| 10,849,088 B2 | 11/2020 | Park et al. |
| 2014/0153577 A1 | 6/2014 | Janakiraman et al. |

(Continued)

FOREIGN PATENT DOCUMENTS

| KR | 20130028102 | 3/2013 |
| KR | 20150106422 | 9/2015 |

OTHER PUBLICATIONS

PCT International Application No. PCT/KR2018/000438, International Search Report dated May 11, 2018, 3 pages.

(Continued)

*Primary Examiner* — Marcos L Torres
(74) *Attorney, Agent, or Firm* — LEE, HONG, DEGERMAN, KANG & WAIMEY

(57) ABSTRACT

It is disclosed a method for managing a PDU session in a wireless communication system and an apparatus for supporting the same. Particularly, a method for performing handover of a User Equipment (UE) performed by a source Radio Access Network (RAN) that includes a processor, a memory and a communication module in a wireless communication system may include determining to initiate handover to a target RAN; and transmitting a Handover Required message to a source Access and Mobility Management Function (AMF), and the handover is a handover in a case that there is no interface between the RANs or AMF change is required, and the Handover Required message includes a PDU session Identifier (ID) of an activated Protocol Data Unit (PDU) session.

10 Claims, 22 Drawing Sheets

Related U.S. Application Data

(60) Provisional application No. 62/443,840, filed on Jan. 9, 2017.

(56) References Cited

U.S. PATENT DOCUMENTS

| | | | |
|---|---|---|---|
| 2015/0085845 A1* | 3/2015 | Wang | H04W 76/14 370/338 |
| 2016/0088527 A1 | 3/2016 | Wolff et al. | |
| 2016/0183156 A1 | 6/2016 | Chin et al. | |
| 2016/0205661 A1* | 7/2016 | Ryu | H04W 68/02 455/458 |
| 2018/0199243 A1* | 7/2018 | Bharatia | H04W 36/0066 |
| 2020/0059989 A1* | 2/2020 | Velev | H04W 8/08 |
| 2021/0211960 A1 | 7/2021 | Ryu et al. | |

OTHER PUBLICATIONS

3rd Generation Partnership Project (3GPP), "Technical Specification Group Services and System Aspects; Study on Architecture for Next Generation System (Release 14)," 3GPP TR 23.799 V1.1.0, Oct. 2016, 503 pages.
U.S. Appl. No. 16/065,120, Office Action dated May 26, 2021, 11 pages.
U.S. Appl. No. 16/065,120, Office Action dated Nov. 9, 2021, 12 pages.
U.S. Appl. No. 16/065,120, Office Action dated Apr. 27, 2022, 15 pages.
3rd Generation Partnership Project (3GPP), "Technical Specification Group Services and System Aspects; Study on Architecture for Next Generation System (Release 14)," 3GPP TR 23.799 V14.0.0, Dec. 2016, 522 pages.

* cited by examiner

[FIG. 1]
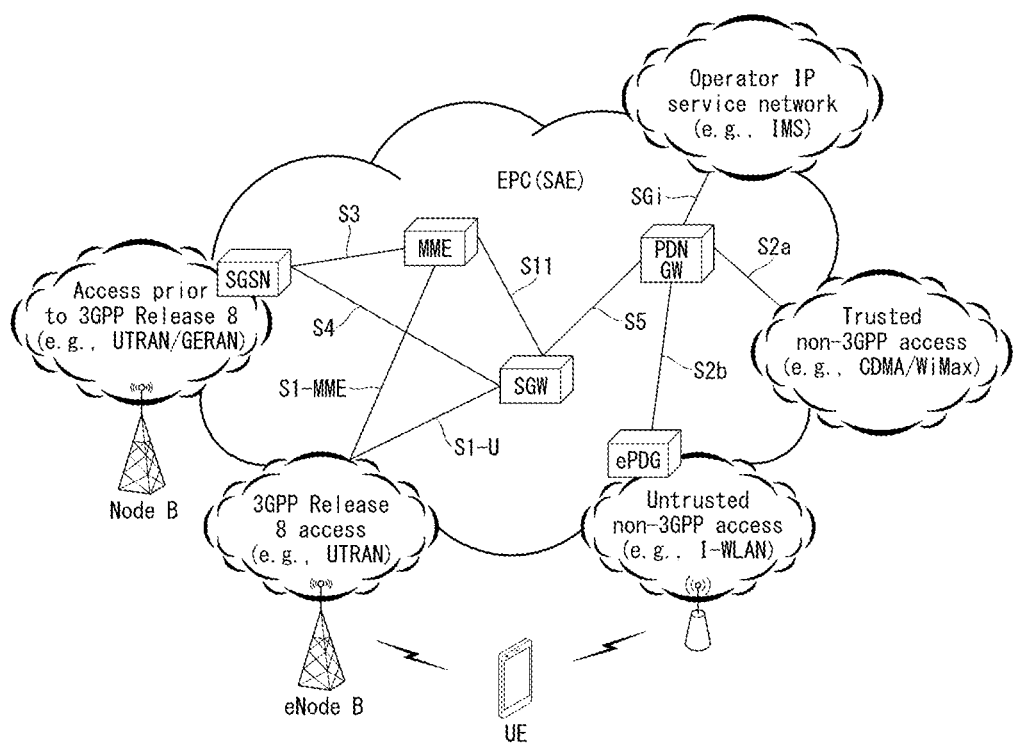

[FIG. 2]
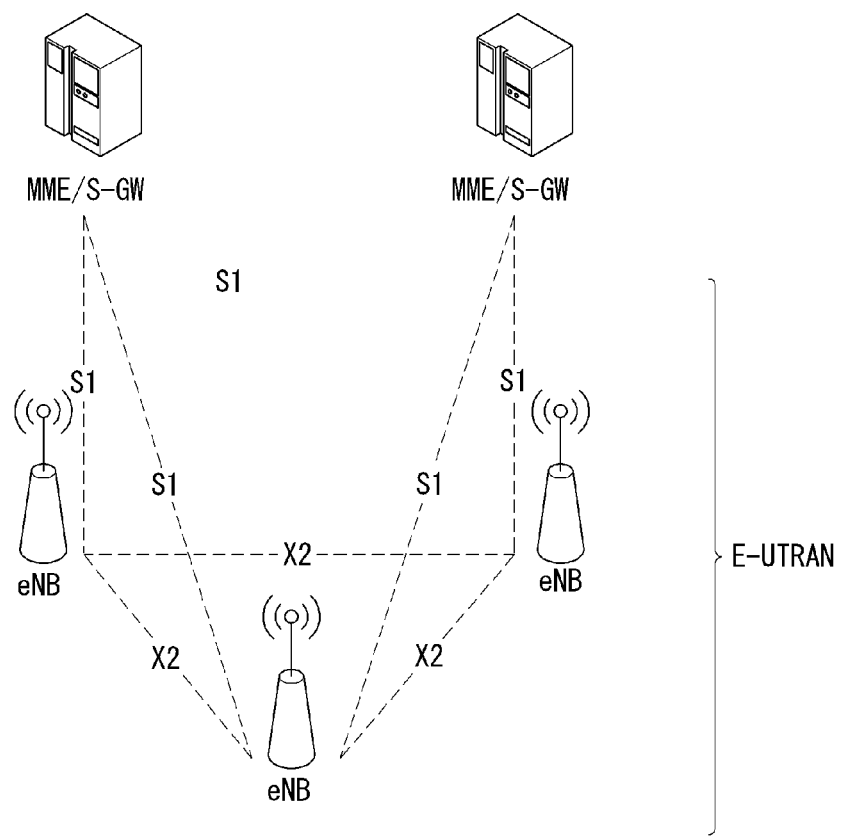

[FIG. 3]
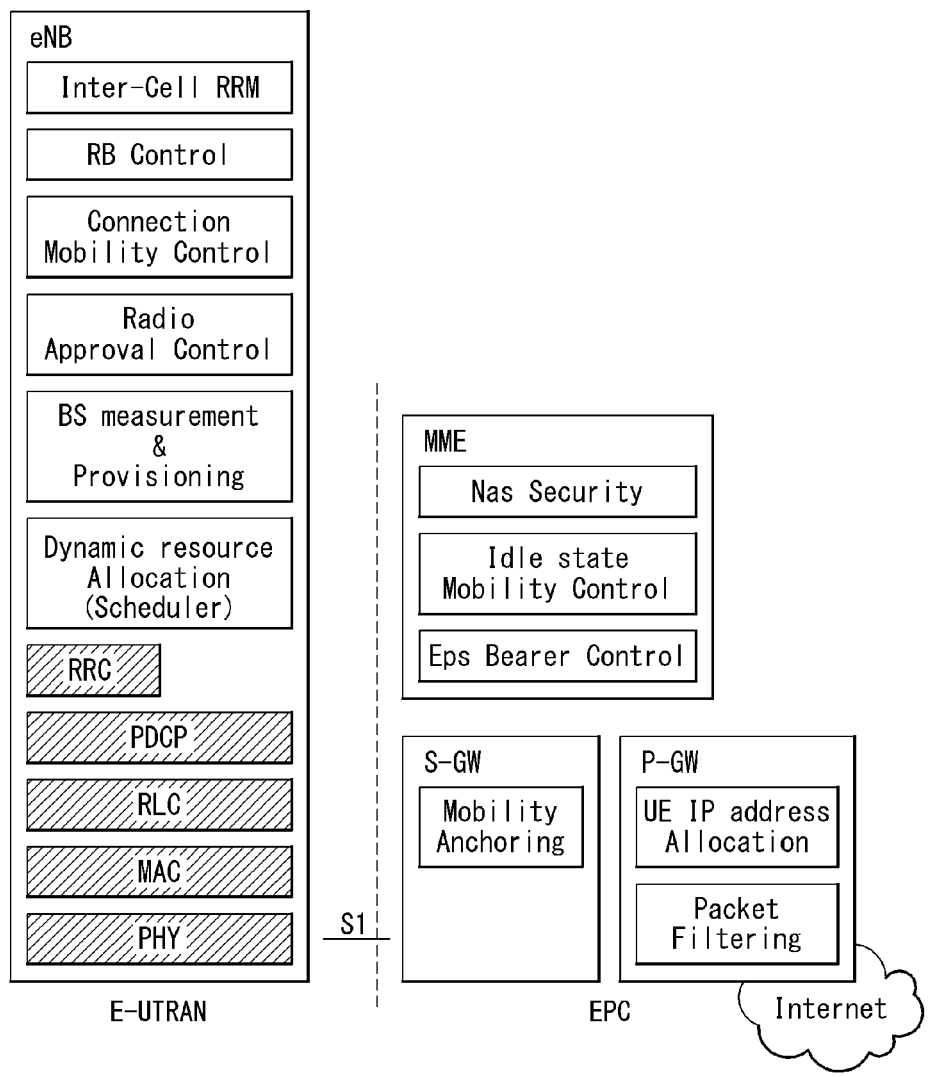

【FIG. 4】
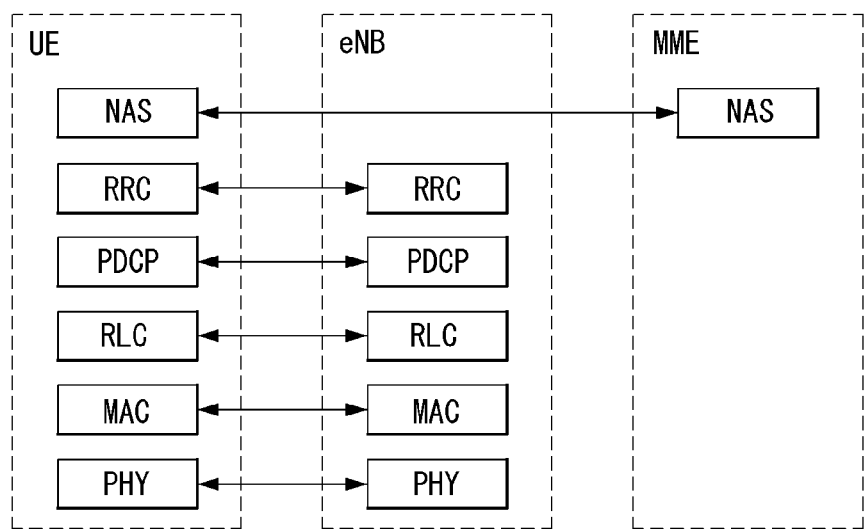
(a) Control plane protocol stack
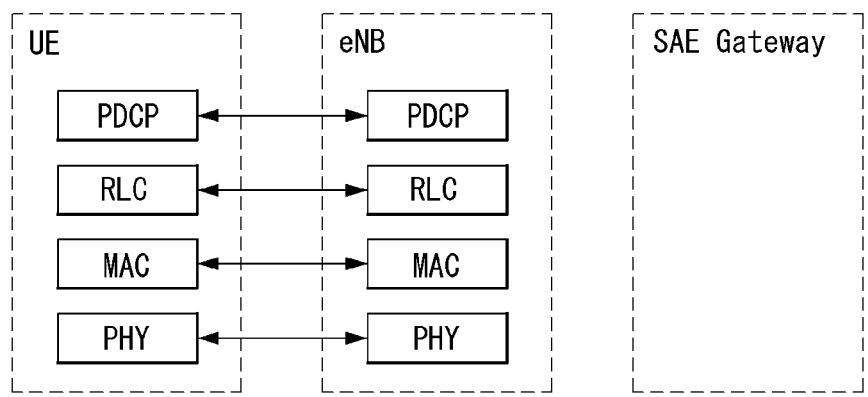
(b) User plane protocol stack 【FIG. 5】
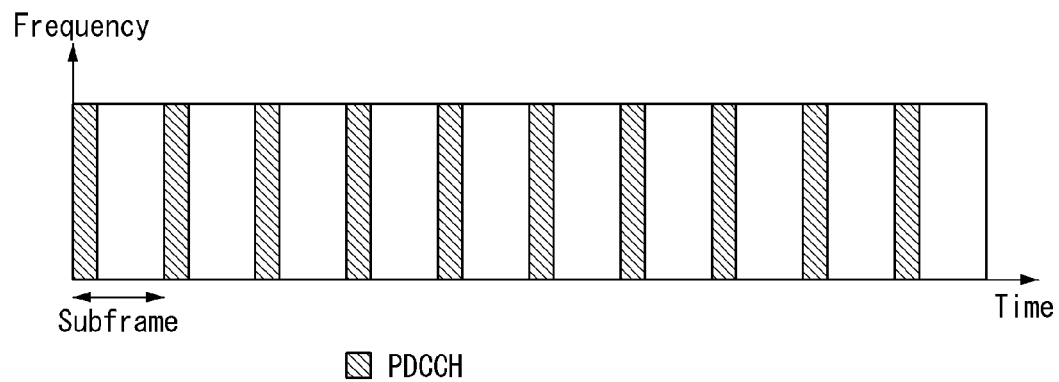
【FIG. 6】
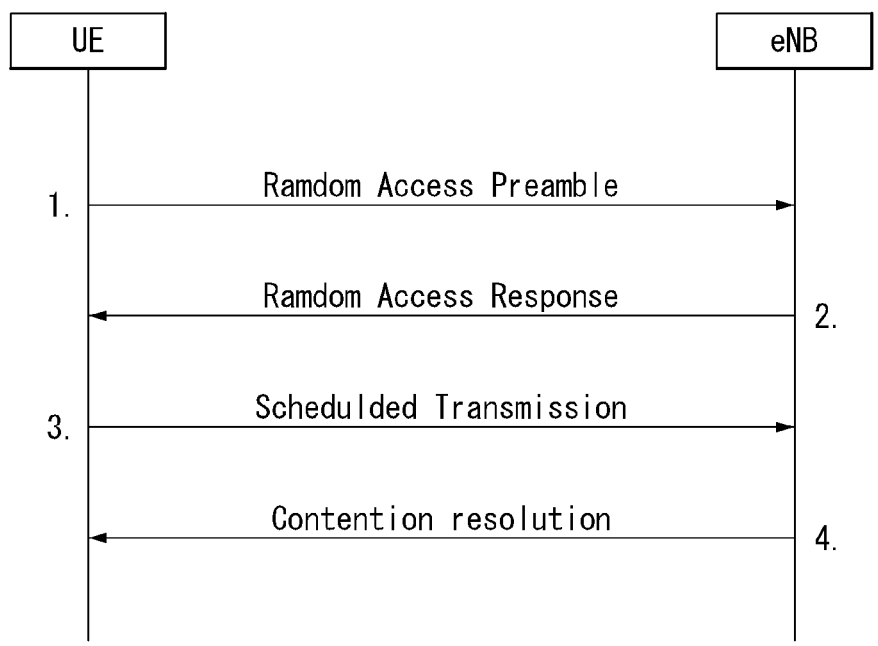

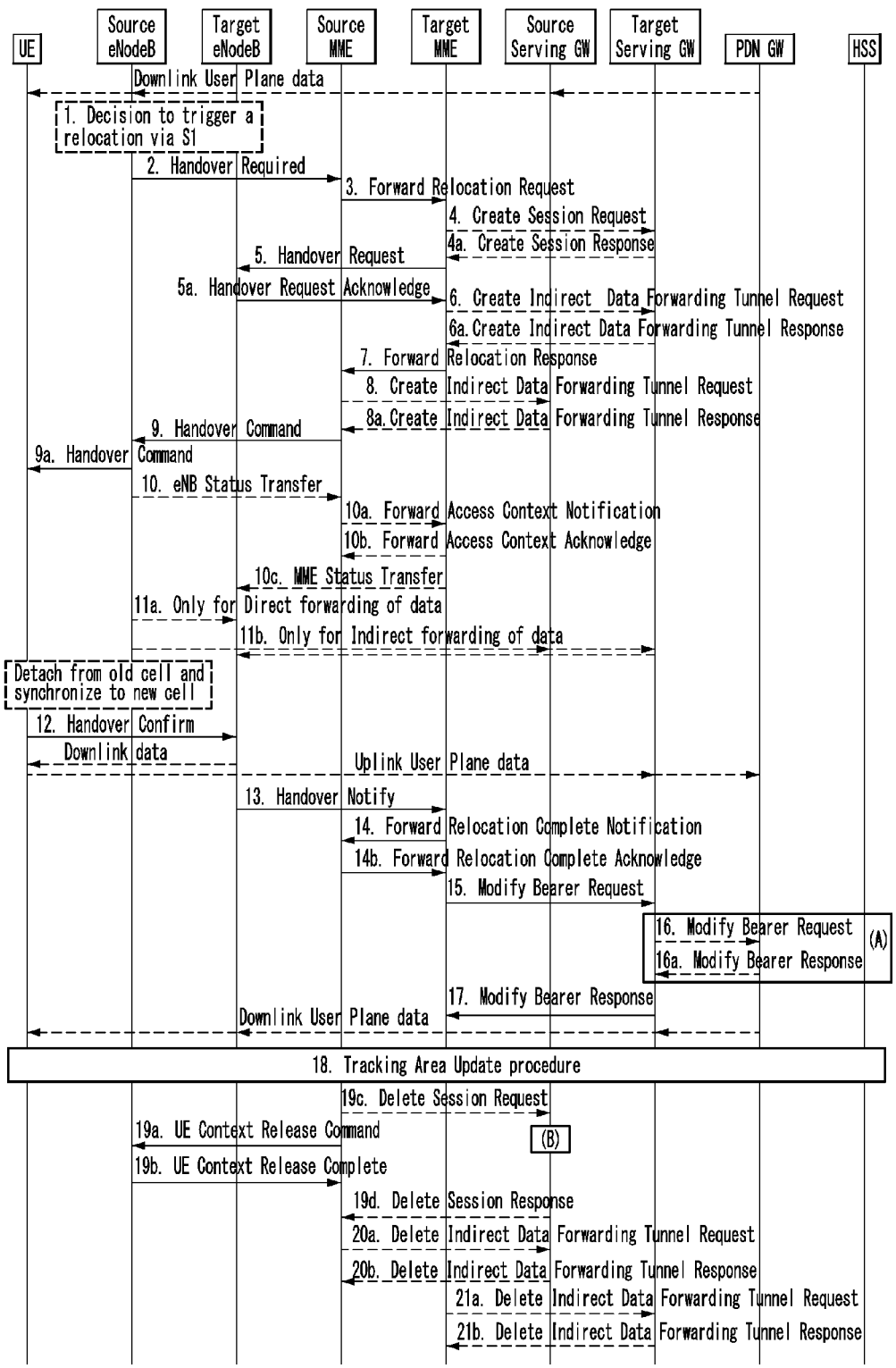
[FIG. 7]

【FIG. 8】
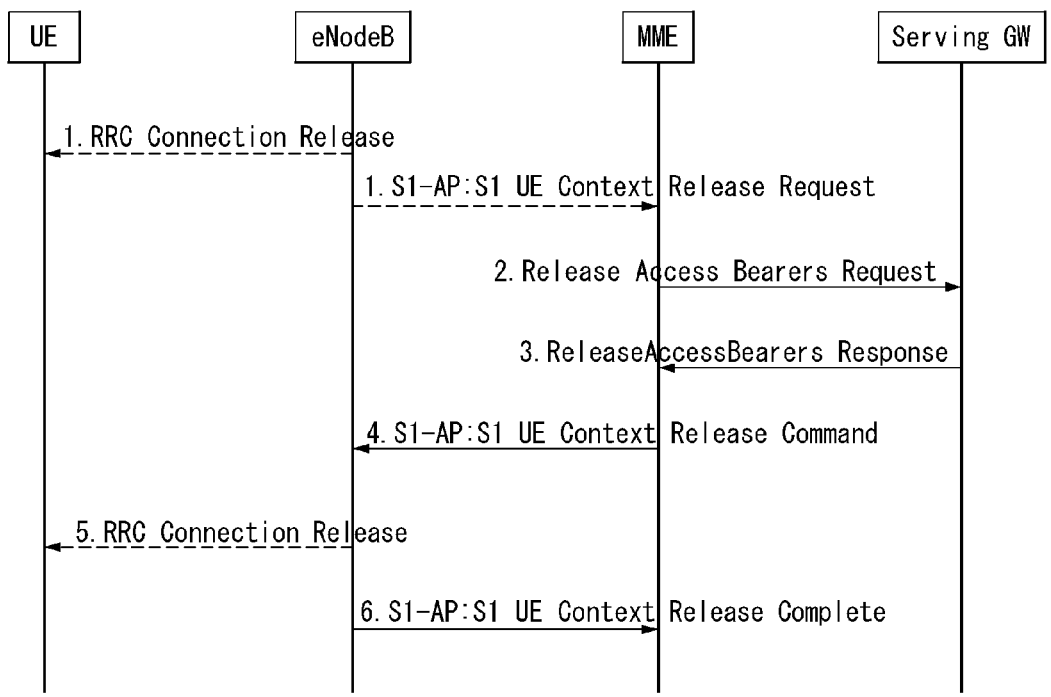
【FIG. 9】
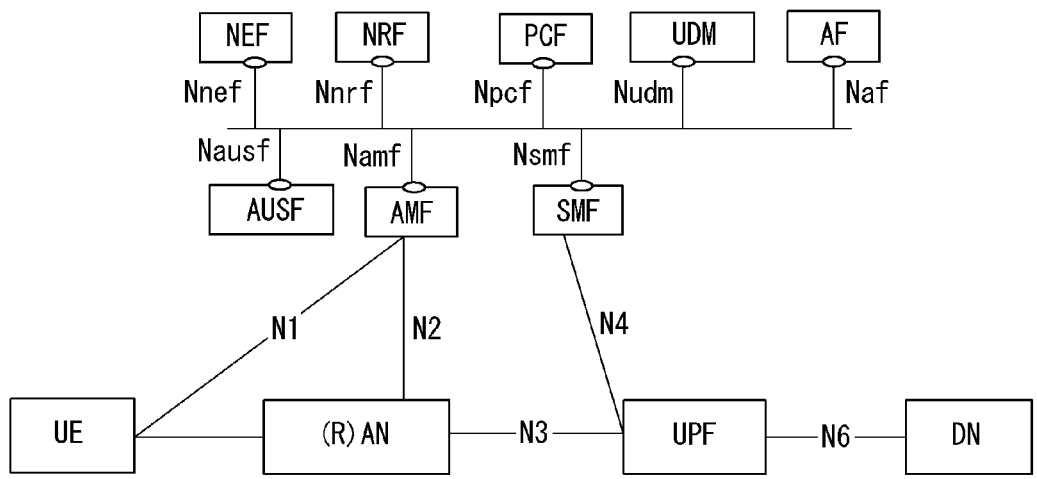

【FIG. 10】
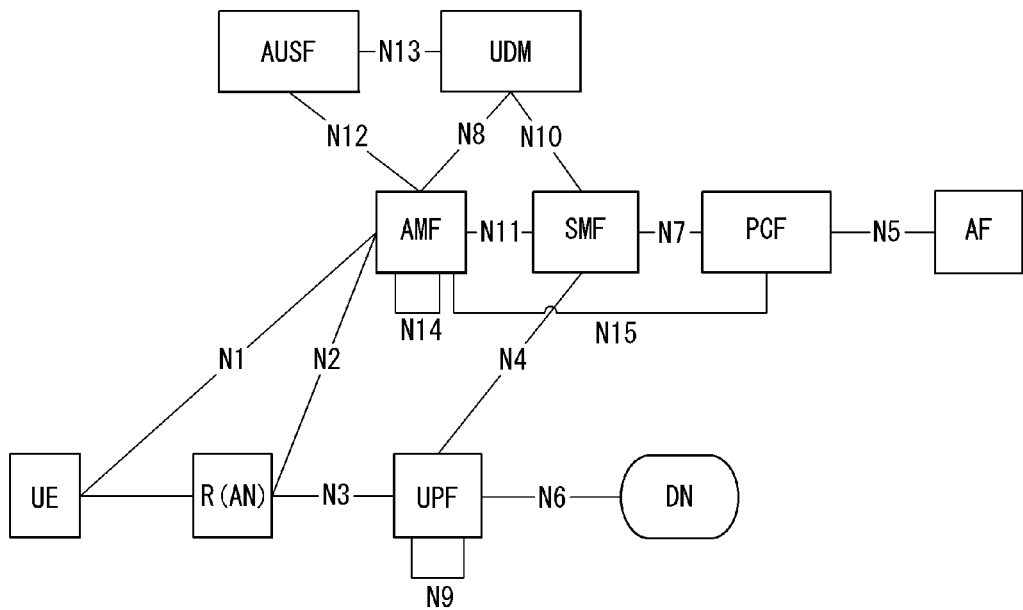
【FIG. 11】
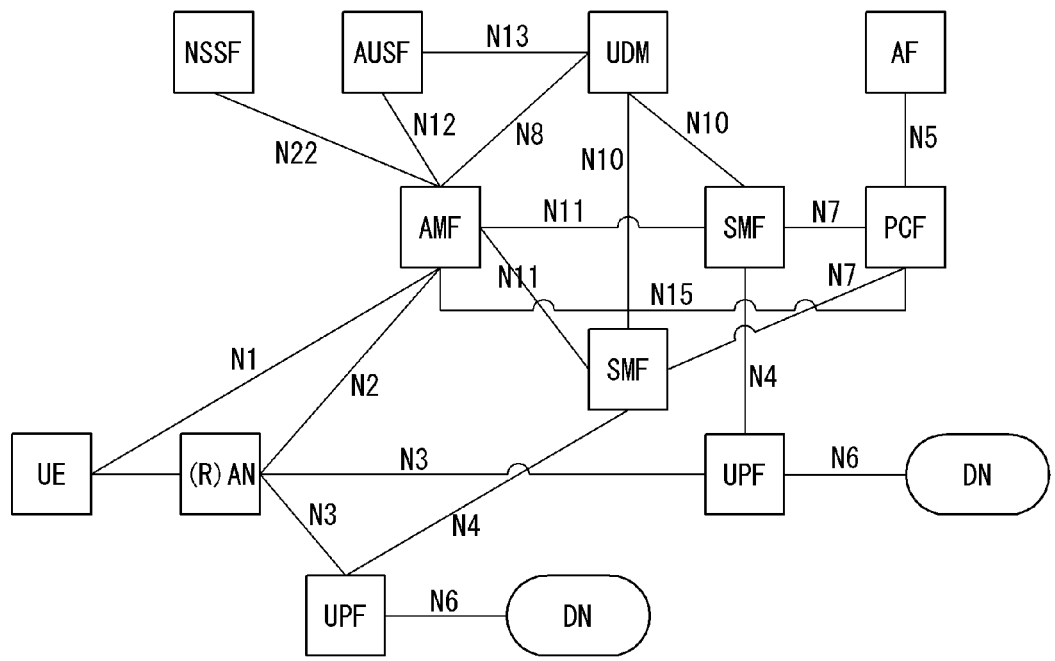

[FIG. 12]
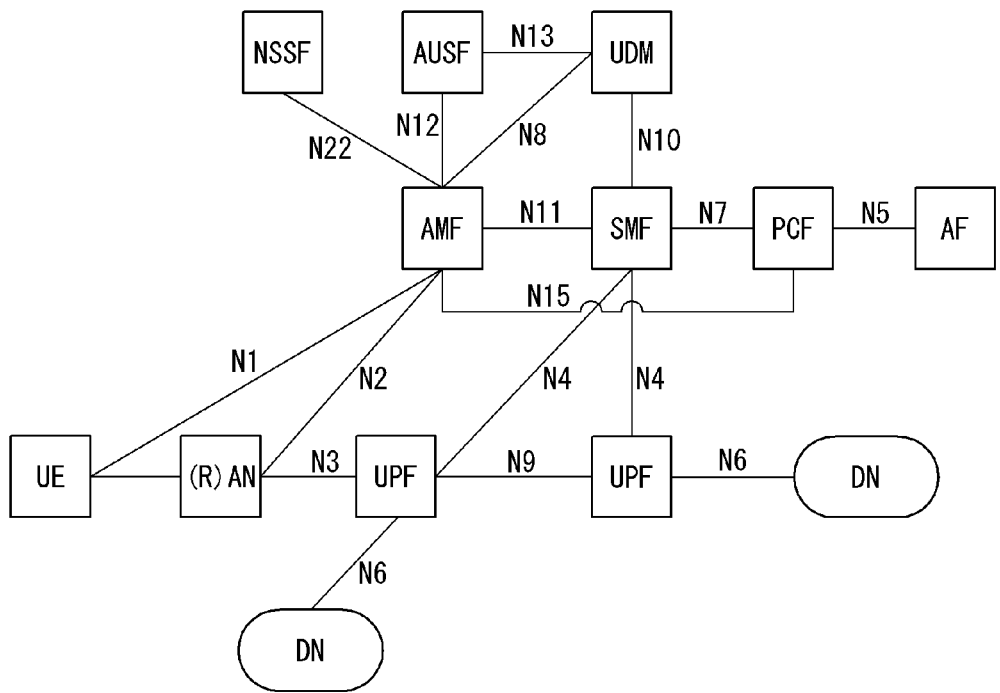
[FIG. 13]
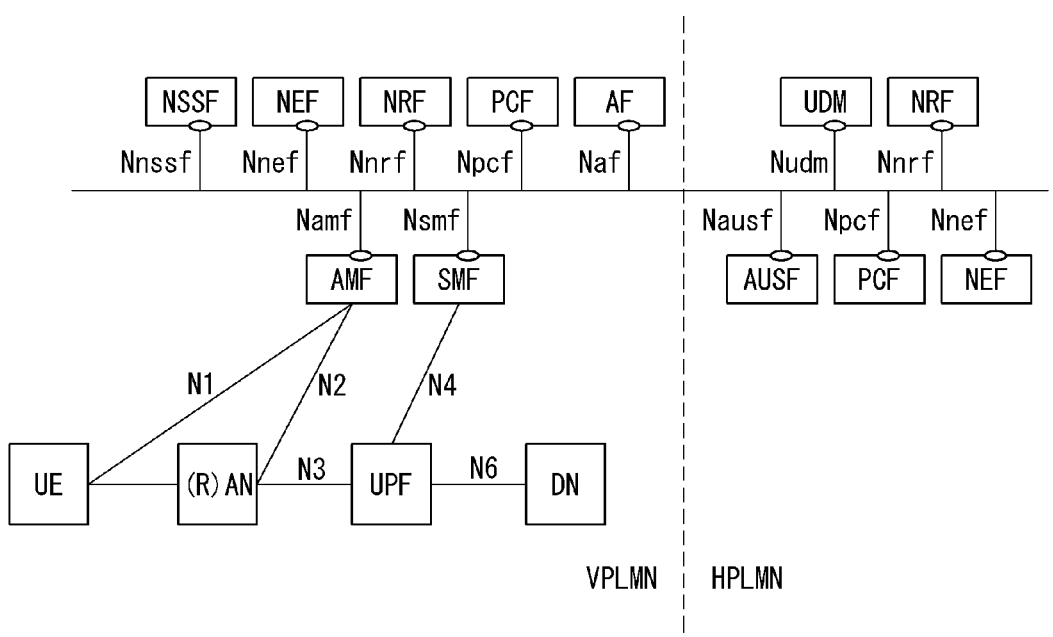

[FIG. 14]
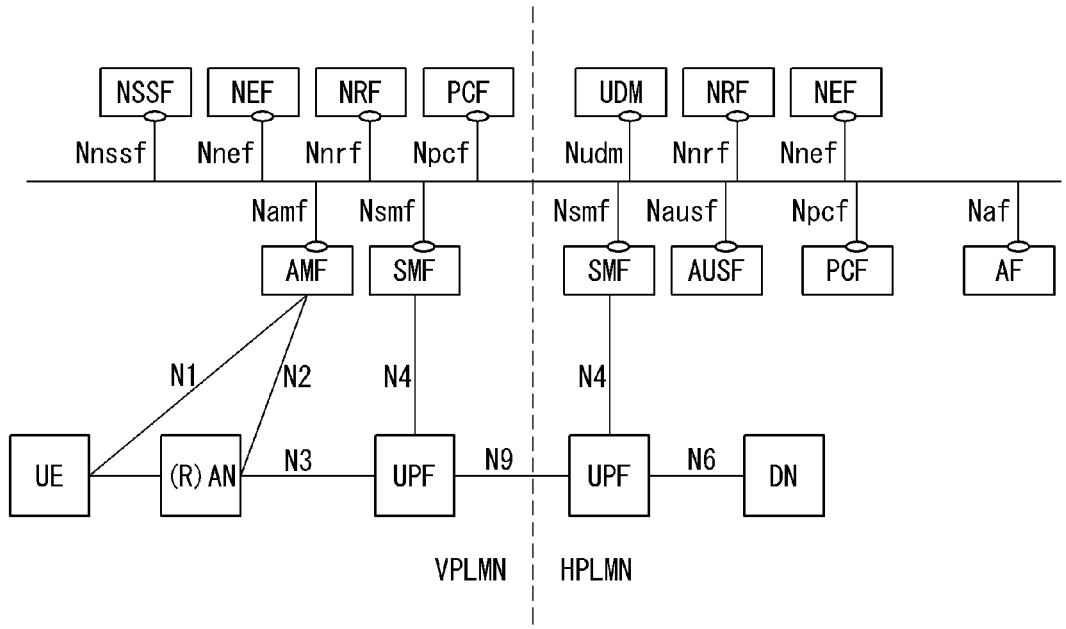
[FIG. 15]
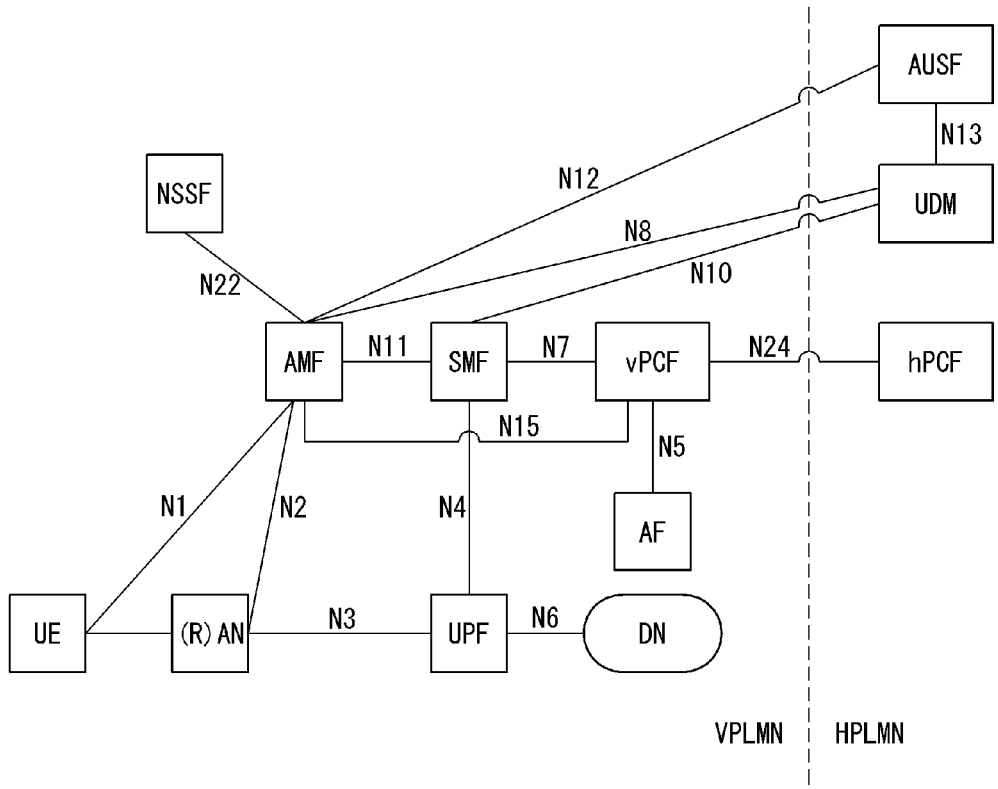

[FIG. 16]
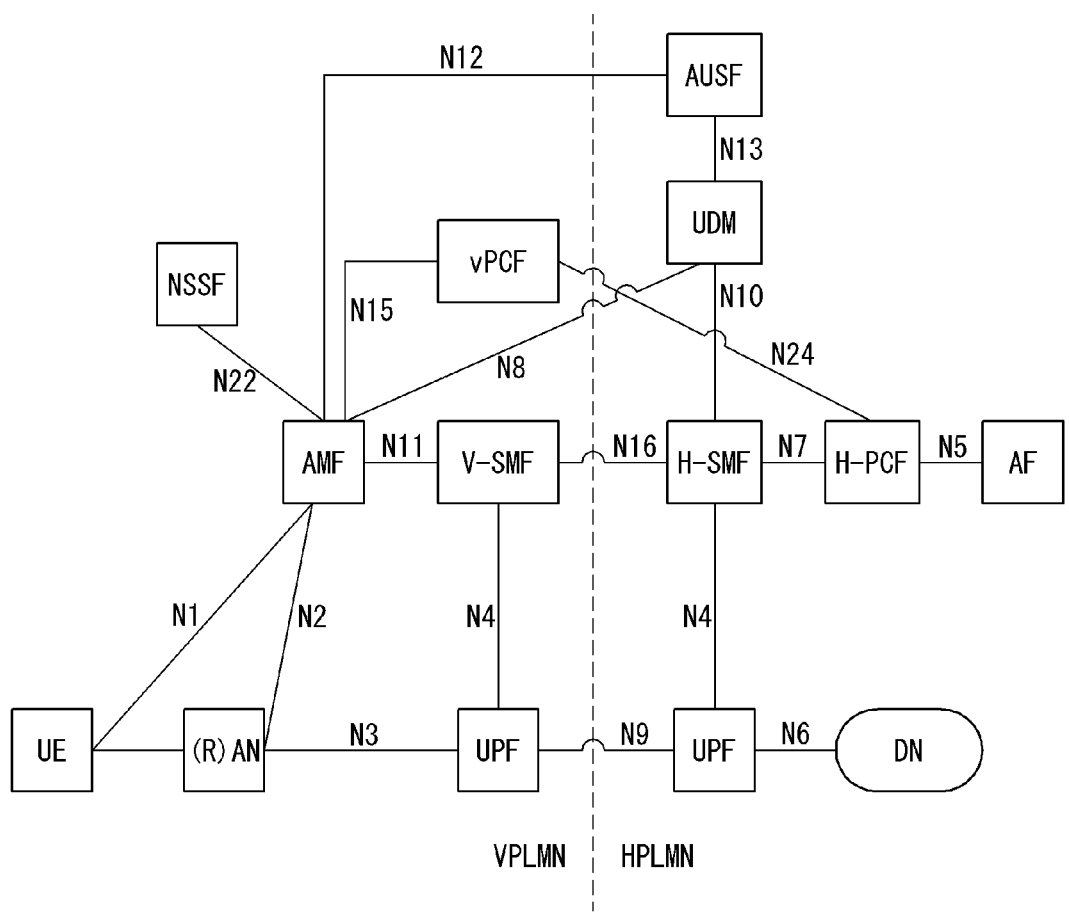

[FIG. 17]
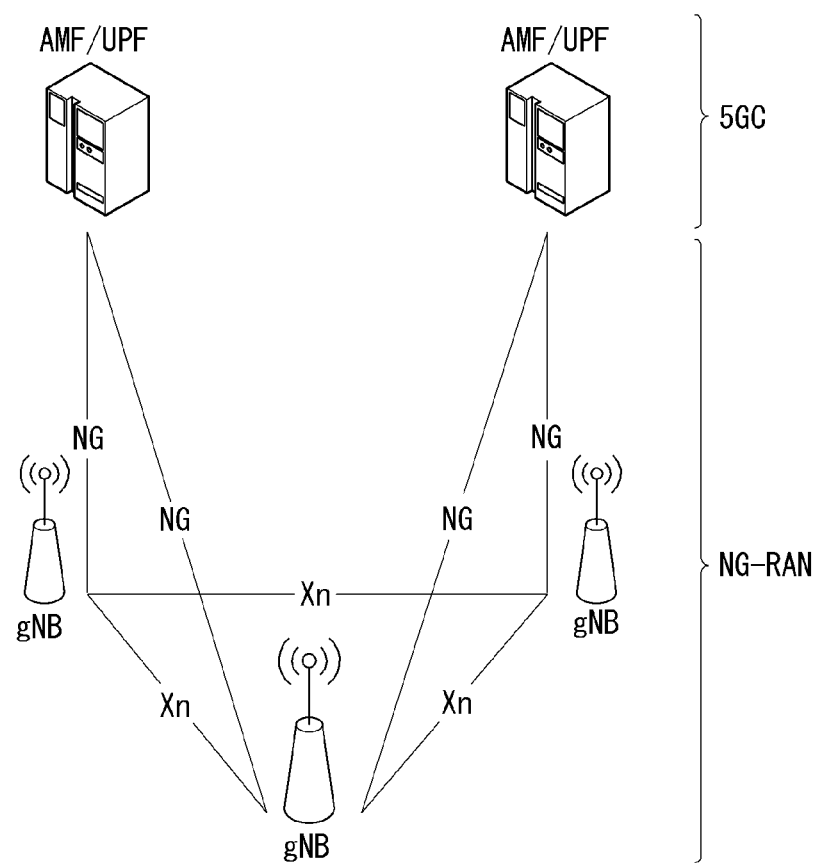

[FIG. 18]
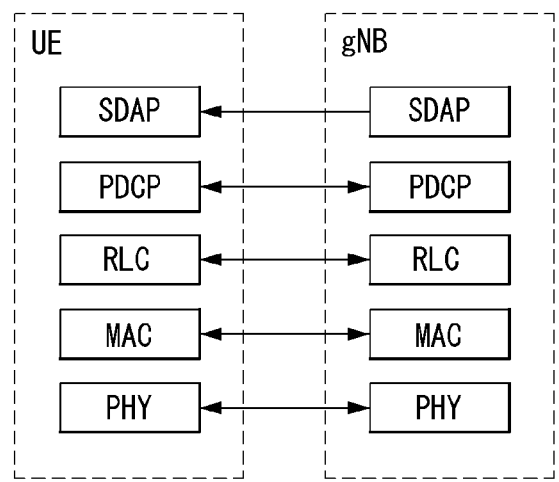
(a)
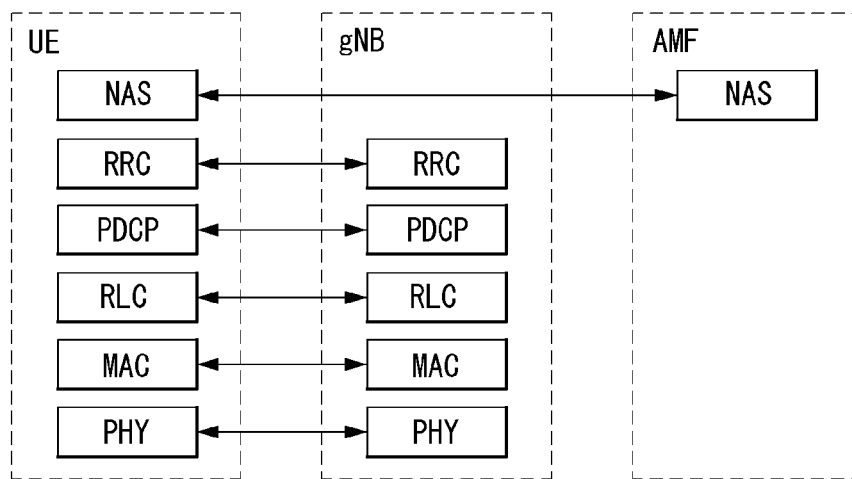
(b)

[FIG. 19]
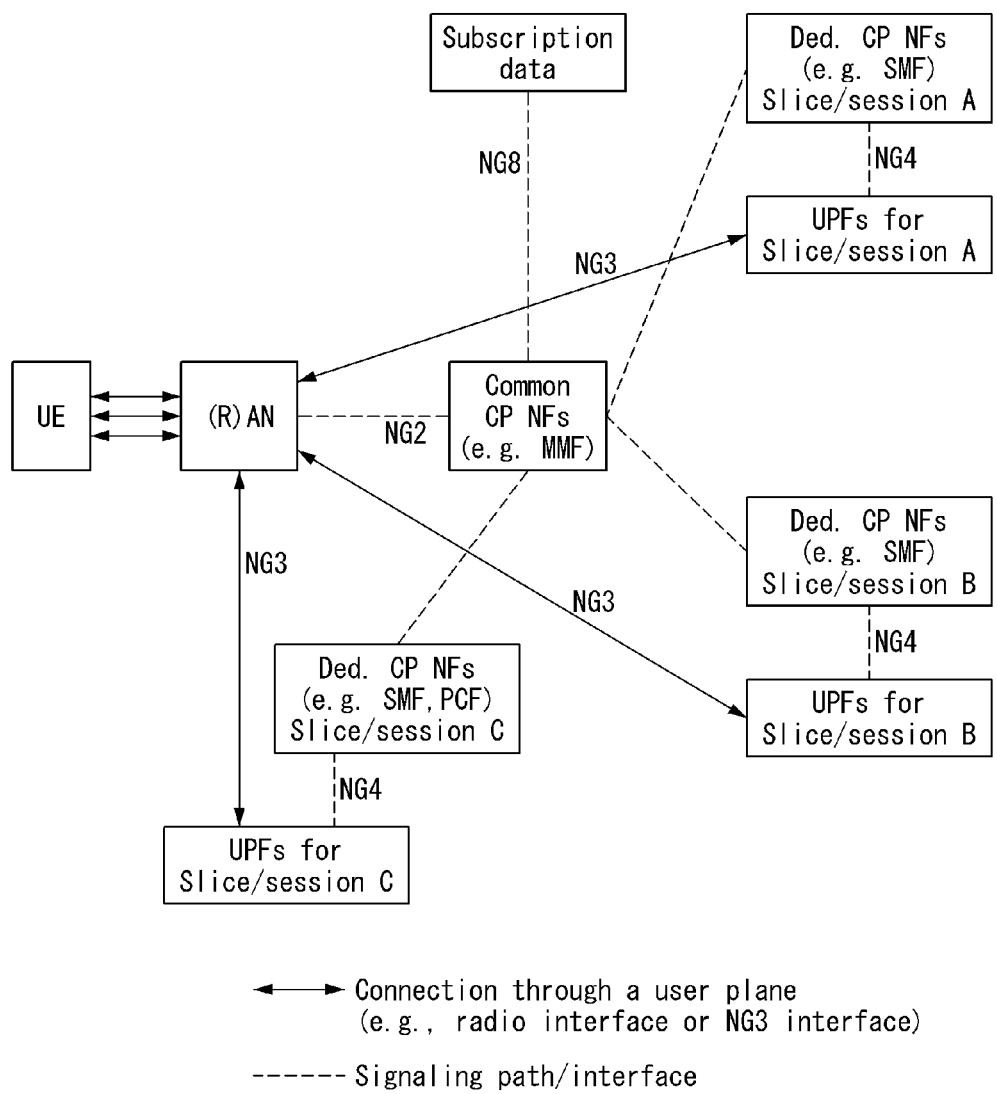

[FIG. 20]
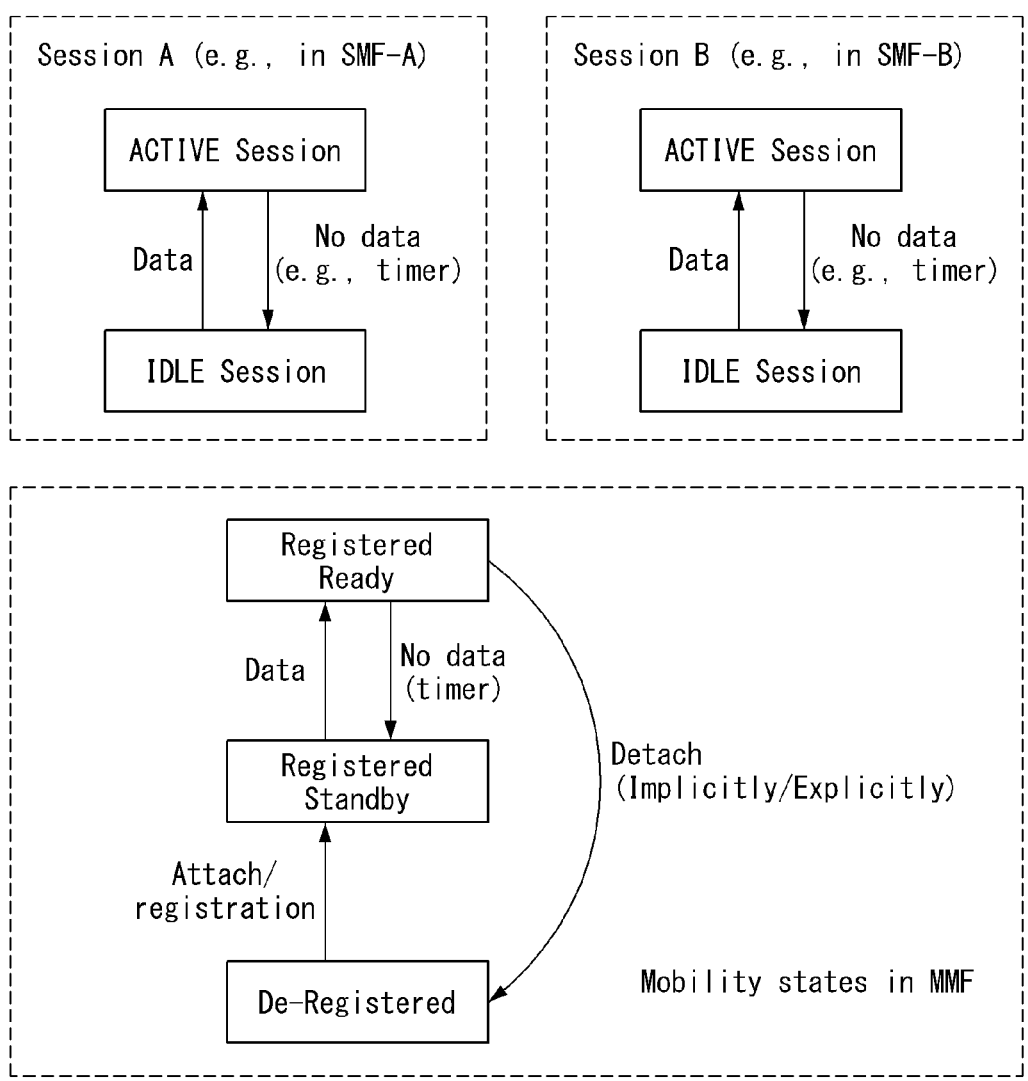

【FIG. 21】
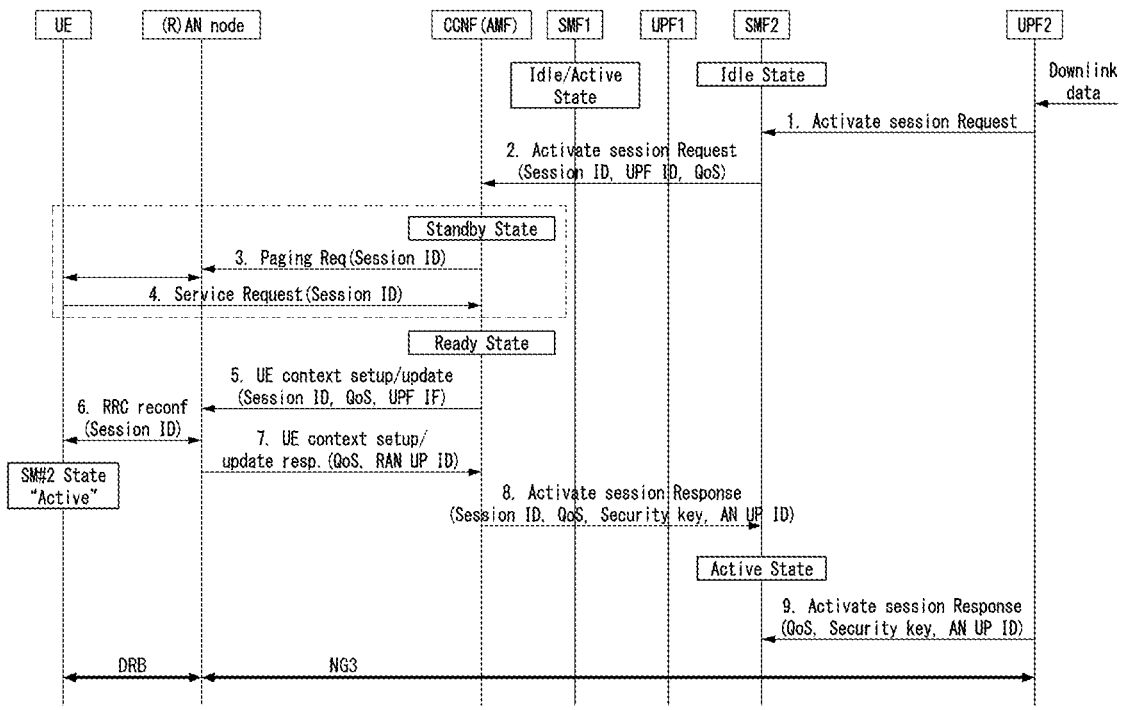

[FIG. 22]
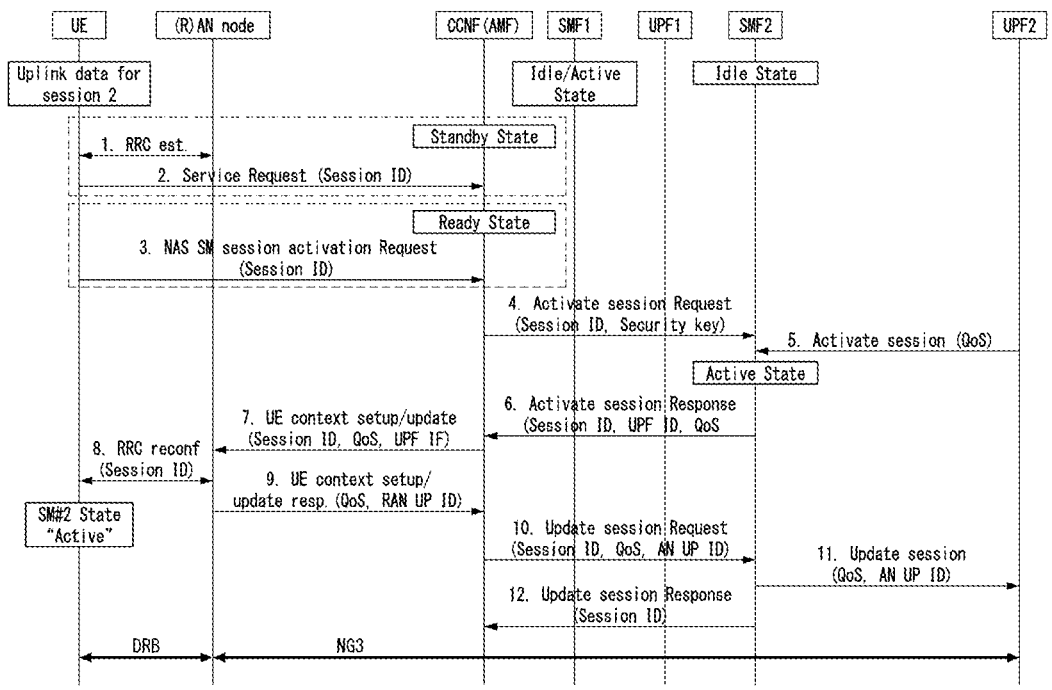

[FIG. 23]
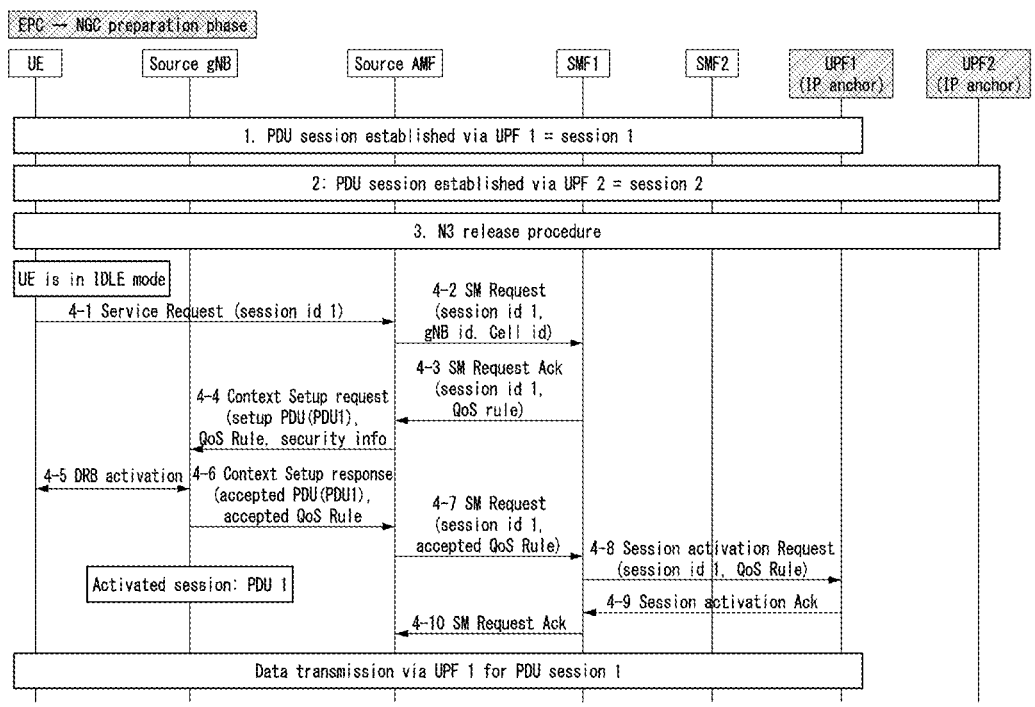

[FIG. 24]
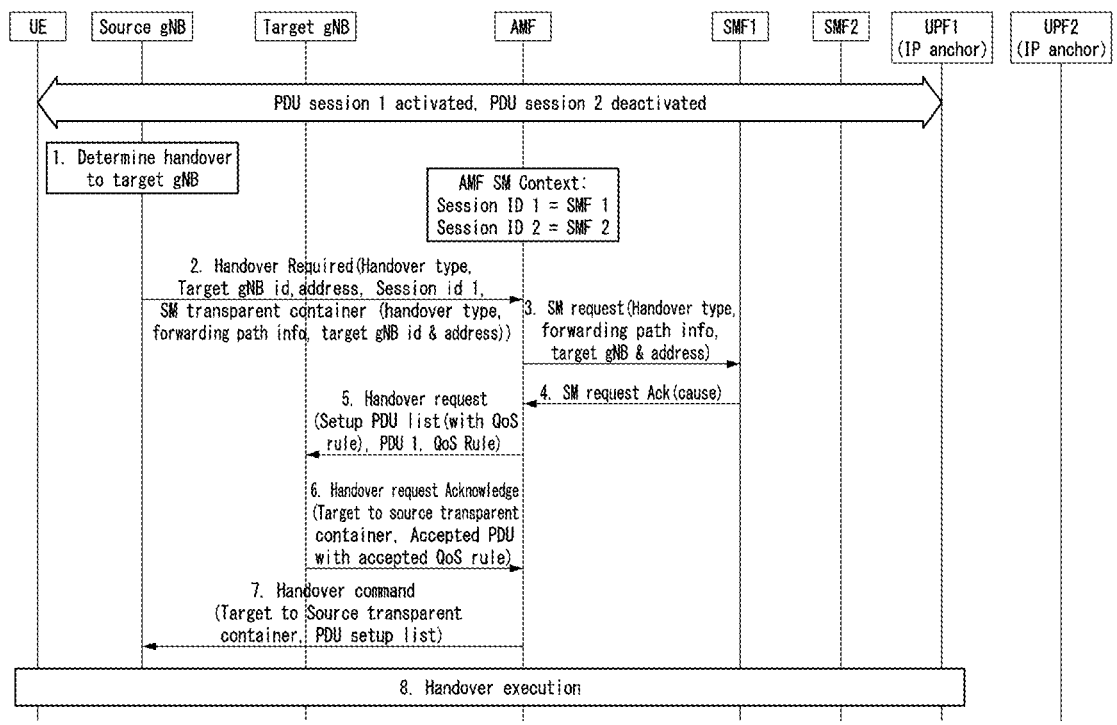

[FIG. 25]
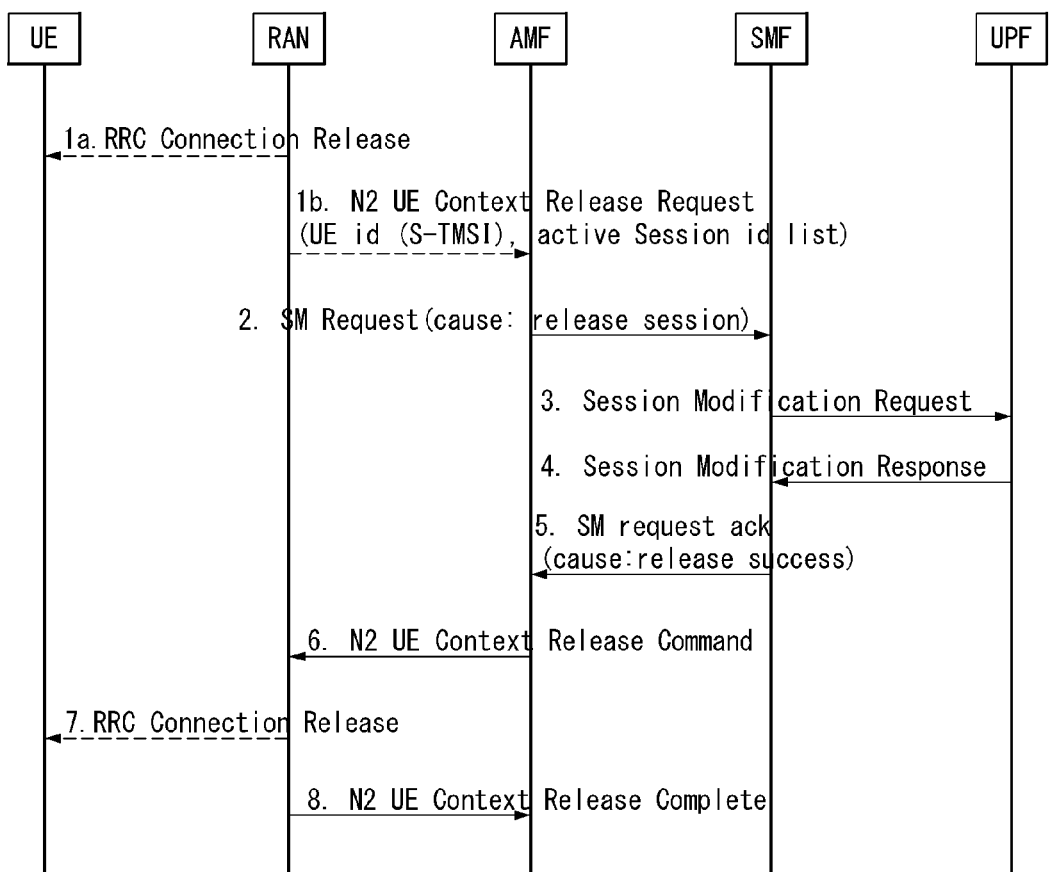

[FIG. 26]
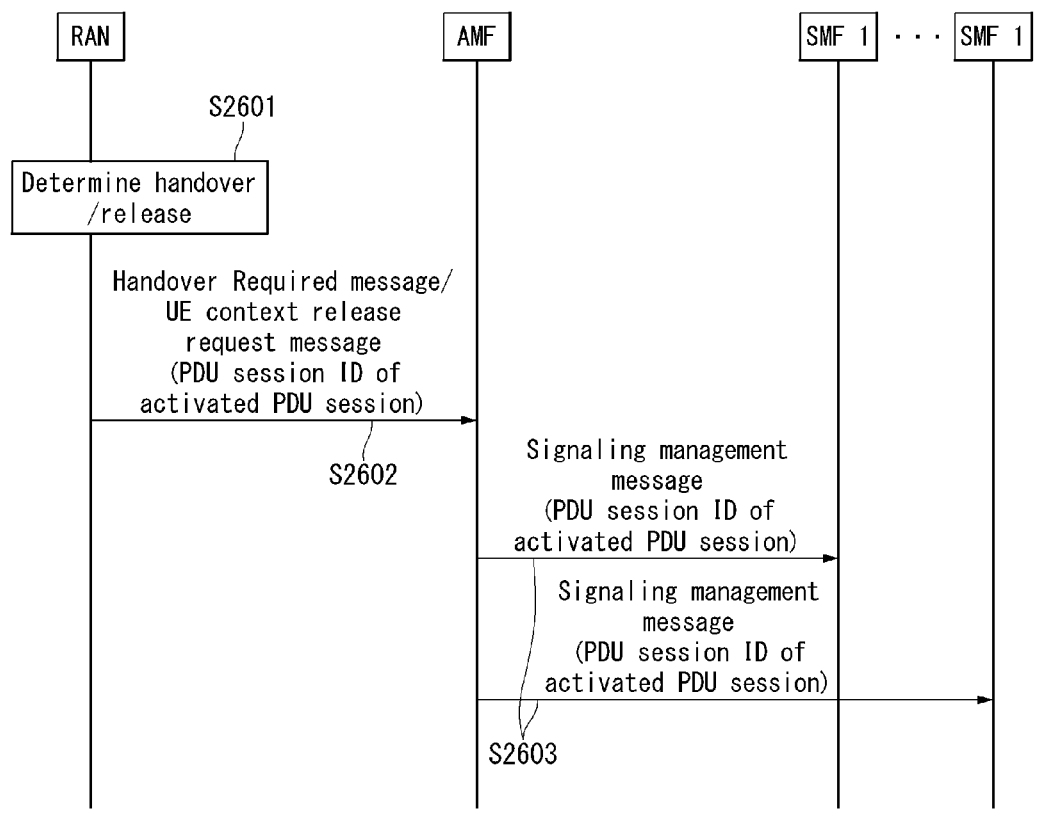
[FIG. 27]
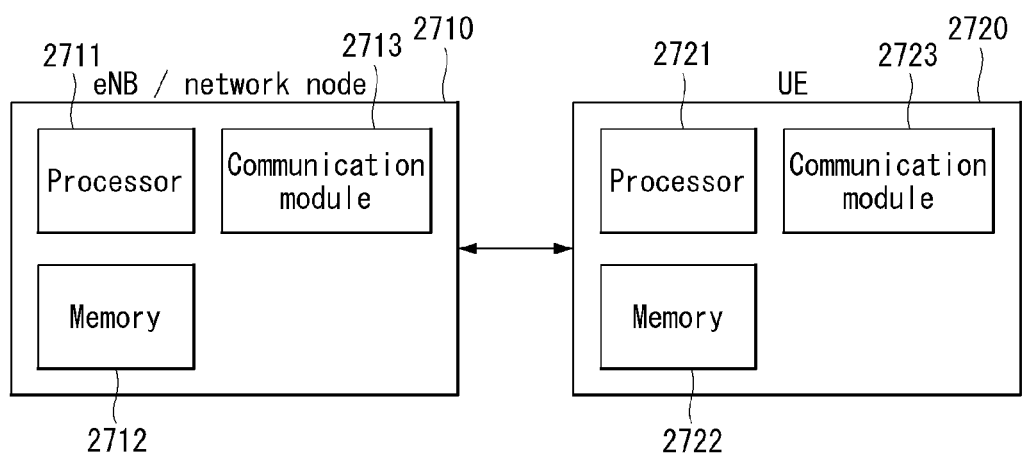

[FIG. 28]
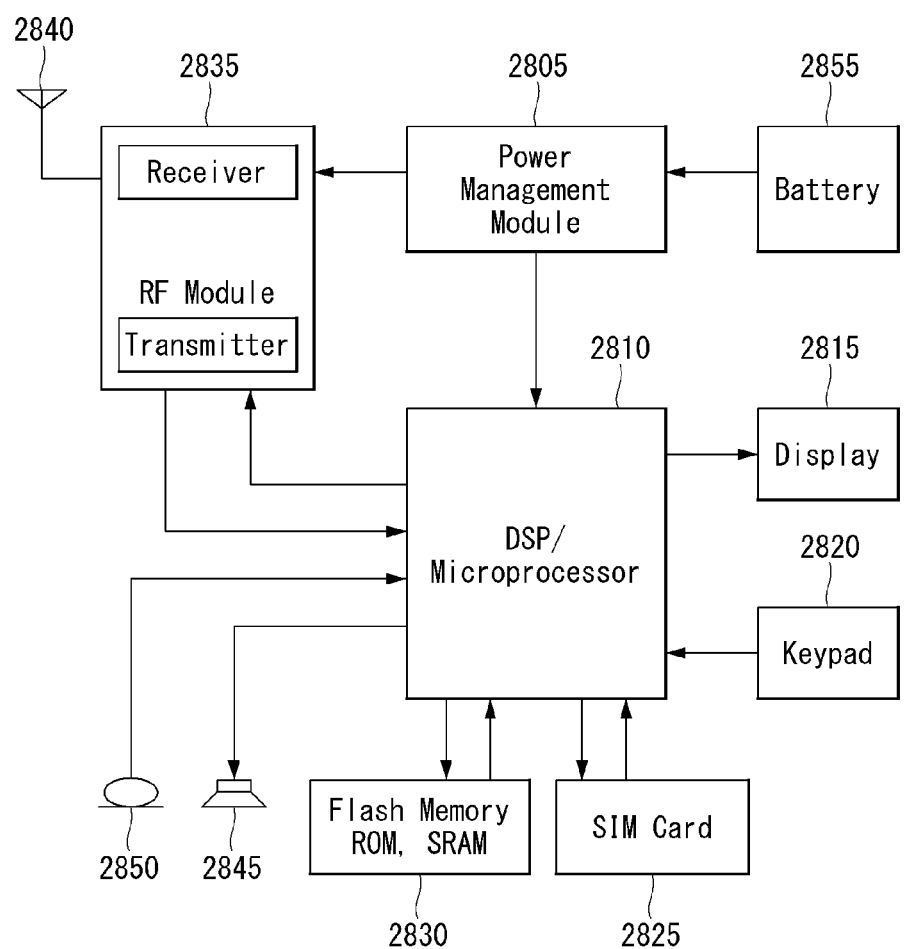

METHOD FOR MANAGING PDU SESSION IN WIRELESS COMMUNICATION SYSTEM AND APPARATUS THEREFOR

CROSS-REFERENCE TO RELATED APPLICATIONS

This application is a continuation of U.S. patent application Ser. No. 16/065,120, filed on Aug. 7, 2018, which is the National Stage filing under 35 U.S.C. 371 of International Application No. PCT/KR2018/000438, filed on Jan. 9, 2018, which claims the benefit of U.S. Provisional Application No. 62/443,840, filed on Jan. 9, 2017, the contents of which are all hereby incorporated by reference herein in their entirety.

TECHNICAL FIELD

The present invention relates to wireless communications, and more particularly, to a method for managing Protocol Data Unit (PDU) session and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for handover of only an activated PDU session when handover is performed due to mobility of a User Equipment (UE).

In addition, an object of the present invention is to propose a method for releasing only an activated PDU session when release procedure is performed due to inactivity of a UE.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to an aspect of the present invention, a method for performing handover of a User Equipment (UE) performed by a source Radio Access Network (RAN) that includes a processor, a memory and a communication module in a wireless communication system may include determining to initiate handover to a target RAN; and transmitting a Handover Required message to a source Access and Mobility Management Function (AMF), and the handover is a handover in a case that there is no interface between the RANs or AMF change is required, and the Handover Required message includes a PDU session Identifier (ID) of an activated Protocol Data Unit (PDU) session.

Preferably, all of PDU sessions processed by the source RAN may correspond to the activated PDU session.

Preferably, the PDU session ID may indicate that handover is requested for a PDU session corresponding to the PDU session ID by the source RAN.

Preferably, the activated PDU session may correspond to a PDU session in which a Data Radio Bearer between the RAN and the UE and N3 interface tunnel between the RAN and a User plane Function (UPF) are established.

Preferably, the Handover Required message may include an identifier of the target RAN and a Source to Target Transparent Container including radio related information transparently transmitted from the source RAN to the target RAN through a core network.

Preferably, the AMF may be a network entity providing a mobility management function of the UE except a session management function of the UE, and the session management function of the UE may be provided by a Session Management Function (SMF).

According to another aspect of the present invention, a method for performing handover of a User Equipment (UE) performed by a source Access and Mobility Management Function (AMF) that includes a processor, a memory and a communication module in a wireless communication system may include receiving a Handover Required message from a source Radio Access Network (RAN), wherein the Handover Required message includes a PDU session ID of an activated Protocol Data Unit (PDU) session; and transmitting a Session Management (SM) message to a Session Management Function (SMF) associated for each PDU session indicated by the received PDU session ID.

Preferably, the AMF may store an association between the PDU session ID and an SMF ID.

Preferably, the method may further include receiving UPF address for N3 interface path configuration between the RAN and a User plane Function (UPF) and Quality of Service (QoS) information of the PDU session from the SMF in which the SM message is forwarded.

Preferably, the method may further include transmitting the Handover Required message to the target RAN, and the Handover Required message may include a list of the PDU session in which handover is accepted and QoS rule information of a PDU session belonged to the list of the PDU session.

Preferably, the method may further include receiving a Handover Request Acknowledge message in response to the Handover Required message from the target RAN, and the Handover Request Acknowledge message may include a Source to Target Transparent Container including radio related information transparently transmitted from the target RAN to the source RAN through a core network and accepted PDU session information having accepted QoS rule.

Preferably, the method may further include transmitting a Handover Command message to the source RAN, and the Handover Command message may include a Target to Source transparent container and a PDU setup list for a PDU session which is a target of setup.

Preferably, the AMF may be a network entity providing a mobility management function of the UE except a session management function of the UE, and the session management function of the UE may be provided by the SMF.

Technical Effects

According to an embodiment of the present invention, activated PDU session information is provided from a RAN to an AMF, and accordingly, the AMF is not required to maintain Signaling Management (SM) context (i.e., context for activated PDU session) unnecessarily.

In addition, according to an embodiment of the present invention, activated PDU session information is provided from a RAN to an AMF, and accordingly, unnecessary signaling may be prevented such as the AMF queries activated PDU session to an SMF, and the like.

In addition, according to an embodiment of the present invention, activated PDU session information provided from a RAN to an AMF, and accordingly, unnecessary signaling/process operation is minimized, and delay of handover procedure and release procedure may be prevented.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 illustrates S1-based handover procedure in a wireless communication system to which the present invention may be applied.

FIG. 8 is a diagram illustrating S1 release procedure in a wireless communication system to which the present invention may be applied.

FIGS. 9 to 16 illustrate a wireless communication system architecture to which the present invention may be applied.

FIG. 17 illustrates NG-RAN architecture to which the present invention may be applied.

FIG. 18 is a diagram illustrating wireless protocol stack in a wireless communication system to which the present invention may be applied.

FIG. 19 illustrates reference architecture of a wireless communication system to which the present invention may be applied.

FIG. 20 illustrates a session/mobility state machine in a wireless communication system to which the present invention may be applied.

FIGS. 21 and 22 are diagrams illustrating a session activation procedure in a wireless communication system to which the present invention may be applied.

FIG. 23 is a diagram illustrating an activation procedure for a PDU session in a wireless communication system to which the present invention may be applied.

FIG. 24 is a diagram illustrating a method for performing handover according to an embodiment of the present invention.

FIG. 25 is a diagram illustrating N2 release procedure according to an embodiment of the present invention.

FIG. 26 is a diagram illustrating a method for managing a PDU session according to an embodiment of the present invention.

FIG. 27 illustrates a block diagram of a communication device according to one embodiment of the present invention.

FIG. 28 illustrates a block diagram of a wireless communication apparatus according to an embodiment of the present invention.

BEST MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: A base station of the UMTS network. The Home NodeB is installed inside and provides coverage of micro cell.

Home eNodeB: A base station of the EPS network. The Home eNodeB is installed inside and provides coverage of micro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Mobility Management Entity (MME): A network node of the EPS that performs functions such as mobility management, session management, and the like.

Packet Data Network Gateway (PDN-GW): A network node of the EPS that performs functions such as UE internet protocol (IP) address allocation, Packet screening and filtering, Charging data collection, and the like.

Serving Gateway (GW): A network node of the EPS that performs functions such as mobility anchor, Packet routing, idle mode packet buffering, MME triggering for paging a UE, and the like.

Policy and Charging Rule Function (PCRF): A network node of the EPS that performs a Policy decision for applying differentiated Quality of Service (QoS) for a service flow and charging policy dynamically.

Open Mobile Alliance Device Management (OMA DM): A protocol designed for managing mobile devices such as a cellular phone, a PDA, a portable computer, and so on, and performs functions such as device configuration, firmware upgrade, Error Report, and the like.

Operation Administration and Maintenance (OAM): OAM means a network deficiency display, performance information and network management functional group that provides data and diagnostic function.

NAS configuration Management Object (MO): This means a Management Object (MO) used for configuring the parameters associated with NAS functionality to a UE.

Packet Data Network (PDN): A network in which a server (e.g., Multimedia Messaging Service (MMS) server, wireless application protocol server, etc.) that supports a specific service is located.

Access Point Name (APN): A string designating or distinguishing PDN. In order to access a requested service or network (PDN), a corresponding P-GW is going through, and this is a predefined name (string) in a network to find the P-GW (e.g., internet.mnc012.mcc345.gprs)

PDN connection: A connection from a UE to PDN, that is, an association (connection) between a UE represented by an IP address and PDN represented by APN.

Home Location Register (HLR)/Home Subscriber Server (HSS): a database provisioning subscriber information within the 3GPP network. An HSS can perform functions of configuration storage, identity management, user state storage, and so on.

Radio Access Network (RAN): a unit including a Node B, a Radio Network Controller (RNC) controlling the Node B, and an eNodeB in the 3GPP network. The RAN is defined at the terminal level and provides a connection to a core network.

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Access Stratum: This includes a protocol stack between a UE and a wireless (or access) network, and takes in charge of transmitting data and network control signal, and the like.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

Table 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |

-continued

Table 1

| Reference point | Description |
|---|---|
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE ACTIVE state. As described above, the gateway in EPC may perform functions of paging origination, LTE IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

S1-Based Handover

The S1-based (i.e., based on S1 interface reference point) handover procedure is used when the X2-based (i.e., based on X2 interface reference point) handover cannot be used. The source eNodeB initiates a handover by sending Handover Required message over the S1-MME reference point. This procedure may relocate the MME and/or the 5-GW. The MME should not be relocated during inter-eNB handover unless the UE leaves the MME Pool Area where the UE is served. The MME (i.e., target MME for MME relocation) determines if the S-GW needs to be relocated. In the case that the Serving GW needs to be relocated, the MME selects the target S-GW.

The source eNB decides which of the EPS bearers are subject for forwarding downlink. In addition, optionally, the source eNB decides which of the EPS bearers are subject for forwarding uplink data packets from the source eNB to the target eNB. The EPC does not change the decisions taken by the RAN node. Packet forwarding may take place either directly from the source eNB to the target eNB, or indirectly from the source eNB to the target eNB via the source and target S-GWs (or if the S-GW is not relocated, via only the single S-GW).

The availability of a direct forwarding path is determined in the source eNB and indicated to the source MME. In the case that X2 connectivity is available between the source and target eNBs, a direct forwarding path is available.

In the case that a direct forwarding path is not available, indirect forwarding may be used. The source MME uses the indication from the source eNB to determine whether to apply indirect forwarding. The source MME indicates to the target MME whether indirect forwarding should apply. Based on this indication, the target MME determines whether it applies indirect forwarding.

When the MME receives a rejection to an S1 interface procedure (e.g. dedicated bearer establishment/modification/release; location reporting control; NAS message transfer; etc.) from the eNB with an indication that an S1 handover is in progress, the MME may reattempt the same S1 interface procedure when either the handover is complete or is deemed to have failed if the MME is still the serving MME, except in case of S-GW relocation. In the case that the S1 handover changes the serving MME, the source MME may terminate any other ongoing S1 interface procedures except the handover procedure.

In the case that the S1 handover includes the S-GW relocation, and in the case that the MME receives a rejection to a NAS message transfer for a Downlink NAS Transport or Downlink Generic NAS Transport message from the eNB with an indication that an S1 handover is in progress, the MME may resend the corresponding message to the target eNB when either the handover is complete or to the source eNB when the handover is deemed to have failed in the case that the MME is still the serving MME.

In the case that the MME receives a rejection to a NAS message transfer to a UE Context modification Request or for a CS Service Notification with a CS Fallback indication with an indication that an S1 handover is in progress, the MME may resend the corresponding message to the target eNB when either the handover is complete or to the source eNB when the handover is deemed to have failed, in the case that the MME is still the serving MME.

In order to minimize the number of procedures rejected by the eNB, the MME pauses non-handover related S1 interface procedures (e.g. downlink NAS message transfer, E-RAB Setup/Modify/Release, etc.) while a handover is ongoing (i.e. from the time that a Handover Required has been received until either the Handover procedure has succeeded (Handover Notify) or failed (Handover Failure)). Further, the MME continues the corresponding procedure once the Handover procedure has completed, in the case that the MME is still the serving MME, except in case of S-GW relocation.

In the case that during the handover procedure the MME detects that the S-GW or/and the MME needs to be relocated, the MME rejects the P-GW initiated EPS bearer(s) received after handover procedure started. Further, the MME includes an indication that the request has been temporarily rejected due to handover procedure in progress. The rejection is forwarded by the S-GW to the P-GW, with the indication that the request has been temporarily rejected.

Upon reception of a rejection for an EPS bearer(s) P-GW initiated procedure with an indication that the request has been temporarily rejected due to handover procedure in progress, the P-GW starts a locally configured guard timer. The P-GW re-attempts up to a pre-configured number of times, when either it detects that the handover is completed or has failed or at expiry of the guard timer.

In the case that emergency bearer services are ongoing for the UE, handover to the target eNB is performed independent of the Handover Restriction List.

The MME checks, as part of the Tracking Area Update (TAU) in the execution phase, whether the handover is to a restricted area and whether so MME releases the non-emergency bearers.

In the case that emergency bearer services are ongoing for the UE, handover to the target Closed Subscriber Group (CSG) cell is performed independent of the UE's CSG subscription. In the case that the handover is to a CSG cell that the UE is not subscribed, the target eNB accepts the emergency bearers only and the target MME releases the non-emergency PDN connections that were not accepted by the target eNB.

For inter-PLMN handover to a CSG cell, in the case that the source MME has the CSG-Identifier (ID) list of the target PLMN, the source MME uses the corresponding list to validate the CSG membership of the UE in the target CSG cell. Otherwise, based on operator's configuration, the source MME may allow the handover by validating the CSG membership of the UE in the target CSG cell using the CSG-ID list of the registered PLMN-Identifier (ID). In the case that neither the CSG-ID list of the target PLMN nor the operator's configuration permits the handover, the source MME rejects the handover due to no CSG membership information of the target PLMN-ID.

With regard to cellular Internet of Things (CIoT) EPS Optimizations, the source MME attempts to perform handover to a target MME that may support the UE's preferred network operation. For a UE that is using a Non-IP connection to a P-GW, or a PDN connection to a Service Capability Exposure Function (SCEF), in the case that these bearers cannot be supported by the target MME, the source MME does not attempt to handover those bearers, but instead, releases them upon successful completion of the handover. In the case that the MME does not have any bearer for the UE to which the MME may be transferred, then the MME sends an S1-AP Handover Preparation Failure message to the source eNB.

FIG. 7 illustrates S1-based handover procedure in a wireless communication system to which the present invention may be applied.

In FIG. 7, in the case that the S-GW is not relocated, the source S-GW operates as a target S-GW in the box.

1. The source eNB decides to initiate an S1-based handover to the target eNB. For example, this may be triggered by no X2 connectivity to the target eNB, or by an error indication from the target eNB after an unsuccessful X2-based handover, or by dynamic information learnt by the source eNB.

2. The source eNB sends Handover Required to the source MME. The Handover Required message may include Direct Forwarding Path Availability, Source to Target transparent container, target eNodeB Identity, CSG ID, CSG access mode, target Tracking Area Identifier (TAI) and S1AP Cause. The source eNB indicates which bearers are subject to data forwarding. Direct Forwarding Path Availability indicates whether direct forwarding is available from the source eNB to the target eNB. This indication from source eNB may be based on the presence of X2. The target TAI is sent to MME to facilitate the selection of a suitable target MME. When the target cell is a CSG cell or a hybrid cell, the source eNB includes the CSG ID of the target cell. When the target cell is a hybrid cell, the CSG access mode is indicated.

3. The source MME selects the target MME. In the case that it has determined to relocate the MME, the MME sends a Forward Relocation Request message to the target MME. The Forward Relocation Request message may include MME UE context, Source to Target transparent container, RAN Cause, target eNodeB Identity, CSG ID, CSG Membership Indication, target TAI, MS Info Change Reporting Action, UE Time Zone, Direct Forwarding Flag, Serving Network and Local Home Network ID. The target TAI is sent to the target MME to help it to determine whether S-GW relocation is needed. The old Serving Network is sent to target MME to support the target MME to resolve if Serving Network is changed. In network sharing scenarios, Serving Network denotes the serving core network.

The source MME performs access control by checking the UE's CSG subscription when CSG ID is provided by the source eNB. In the case that there is no subscription data for this CSG ID or the CSG subscription is expired, and the target cell is a CSG cell, the source MME rejects the handover with an appropriate cause unless the UE has emergency bearer services.

The MME UE context includes IMSI, ME Identity, UE security context, UE Network Capability, Aggregate Maximum Bit rate (AMBR), Selected CN operator ID, APN restriction, S-GW address and Tunnel Endpoint Identifier (TEID) for control signaling, and EPS Bearer context(s).

An EPS Bearer context includes the P-GW addresses and TEIDs (for GTP-based S5/S8) or General Routing Encapsulation (GRE) keys (for Proxy Mobile Internet Protocol (PMIP)-based S5/S8), APN, S-GW addresses and TEIDs for uplink traffic, and Transaction Identifier (TI).

Based on the CIoT EPS Optimization capabilities of the target MME, the source MME only includes the EPS Bearer Context(s) that the target MME may support. In the case that none of the UE's EPS Bearers may be supported by the selected target MME, the source MME rejects the S1 handover attempt by sending a Handover Preparation Failure message (including cause) to the Source eNB. In the case that the target MME supports CIoT EPS Optimization and the use of header compression has been negotiated between the UE and the source MME, the source MME includes the previously negotiated Header Compression Configuration that includes the information necessary for the Robust Header Compression (ROHC) channel setup but not the ROHC context itself in the Forward Relocation Request.

In the case that an IP Selected IP Traffic Offload (SIPTO) selected at the Local Network is active for a PDN connection in the architecture with stand-alone GW, the source MME includes the Local Home Network ID of the source cell in the EPS Bearer context corresponding to the SIPTO at the Local Network PDN connection.

RAN Cause indicates the S1AP Cause as received from source eNB.

The source MME includes the CSG ID in the Forward Relocation Request message when the target cell is a CSG or hybrid cell. When the target cell is a hybrid cell, or in the case that there are one or several emergency bearers and the target cell is a CSG cell, the CSG Membership Indication indicating whether the UE is a CSG member is included in the Forward Relocation Request message.

The Direct Forwarding Flag indicates whether direct forwarding is applied, or in the case that indirect forwarding is going to be set up by the source side.

The target MME determines the Maximum APN restriction based on the APN Restriction of each bearer context in the Forward Relocation Request, and stores a new Maximum APN restriction value.

In the case that the UE receives only emergency services and the UE has no Universal Integrated Circuit Card (UICC), IMSI may be included in the MME UE context in Forward Relocation Request message. For emergency attached UEs, in the case that the IMSI cannot be authenticated, then the IMSI is marked as unauthenticated. Also, in this case, only security parameters are included.

4. When the MME has been relocated, the target MME verifies whether the source S-GW may continue to serve the UE. If not, it selects a new S-GW. In the case that the MME has not been relocated, the source MME decides on this S-GW re-selection.

When the source S-GW continues to serve the UE, no message is sent in this step. In this case, the target S-GW is identical to the source S-GW.

When a new S-GW is selected, the target MME sends a Create Session Request message per PDN connection to the target S-GW. The Create Session Request message may include bearer context(s) with P-GW addresses and TEIDs (for GTP-based S5/S8) or GRE keys (for PMIP-based S5/S8) at the P-GW for uplink traffic, Serving Network, UE Time Zone. The target S-GW allocates the S-GW addresses and TEIDs for the uplink traffic on S1_U reference point (one TEID per bearer). The target S-GW sends a Create Session Response message to the target MME. The Create Session Response message may include S-GW addresses and uplink TEID(s) for user plane.

5. The Target MME sends Handover Request message to the target eNB. The Handover Request message may include EPS Bearers to Setup, AMBR, S1AP Cause, Source to Target transparent container, CSG ID, CSG Membership Indication, and Handover Restriction List. This message creates the UE context in the target eNB, which includes information about the bearers, and the security context. For each EPS Bearer, the Bearers to Setup include S-GW address and uplink TEID for user plane, and EPS Bearer QoS. In the case that the direct forwarding flag indicates unavailability of direct forwarding and the target MME knows that there is no indirect data forwarding connectivity between source and target, the Bearers to Setup include "Data forwarding not possible" indication for each EPS bearer. Handover Restriction List is sent when it is available in the Target MME.

S1AP Cause indicates the RAN Cause as received from source MME.

The Target MME includes the CSG ID and CSG Membership Indication when provided by the source MME in the Forward Relocation Request message.

The target eNB sends a Handover Request Acknowledge message to the target MME. The Handover Request Acknowledge message may include EPS Bearer Setup list, EPS Bearers failed to setup list, and Target to Source transparent container.

The EPS Bearer Setup list includes a list of addresses and TEIDs allocated at the target eNB for downlink traffic on S1-U reference point (one TEID per bearer), and addresses and TEIDs for receiving forwarded data if necessary. When the UE-AMBR is changed (e.g. all the EPS bearers which are associated to the same APN are rejected in the target eNB), the MME recalculates the new UE-AMBR and signals the modified UE-AMBR value to the target eNB.

In the case that none of the default EPS bearers have been accepted by the target eNB, the target MME rejects the handover.

In the case that the target cell is a CSG cell, the target eNB verifies the CSG ID provided by the target MME, and rejects the handover with an appropriate cause when it does not match the CSG ID for the target cell. In the case that the target eNB is in hybrid mode, it may use the CSG Membership Indication to perform differentiated treatment for CSG and non-CSG members. In the case that the target cell is a CSG cell, and in the case that the CSG Membership Indication is "non member", the target eNB only accepts the emergency bearers.

6. When indirect forwarding applies and the Serving GW is relocated, the target MME sets up forwarding parameters by sending Create Indirect Data Forwarding Tunnel Request message to the S-GW. The sending Create Indirect Data Forwarding Tunnel Request message may include target eNB addresses and TEIDs for forwarding. The S-GW sends a Create Indirect Data Forwarding Tunnel Response message to the target MME. The Create Indirect Data Forwarding Tunnel Response message may include target S-GW addresses and TEIDs for forwarding. In the case that the S-GW is not relocated, indirect forwarding may be set up in step 8 below.

Indirect forwarding may be performed via a S-GW which is different from the S-GW used as the anchor point for the UE.

7. When the MME has been relocated, the target MME sends a Forward Relocation Response message to the source MME. The Forward Relocation Response message may include Cause, Target to Source transparent container, Serving GW change indication, EPS Bearer Setup List, and Addresses and TEIDs.

For indirect forwarding, this message includes S-GW Address and TEIDs for indirect forwarding (source or target). Serving GW change indication indicates a new Serving GW has been selected.

8. When indirect forwarding applies, the source MME sends Create Indirect Data Forwarding Tunnel Request message to the S-GW. The Create Indirect Data Forwarding Tunnel Request message includes addresses and TEIDs for forwarding. When the S-GW is relocated it includes the tunnel identifier to the target S-GW.

The S-GW responds with a Create Indirect Data Forwarding Tunnel Response message to the source MME. The Create Indirect Data Forwarding Tunnel Response message includes S-GW addresses and TEIDs for forwarding.

Indirect forwarding may be performed via a S-GW which is different from the S-GW used as the anchor point for the UE.

9. The source MME sends a Handover Command message to the source eNB.

The Handover Command message may include Target to Source transparent container, Bearers subject to forwarding, and Bearers to Release. The Bearers subject to forwarding includes list of addresses and TEIDs allocated for forwarding. The Bearers to Release includes the list of bearers to be released.

9a. The Handover Command is constructed using the Target to Source transparent container and is sent to the UE. Upon reception of this message the UE will remove any EPS bearers for which it did not receive the corresponding EPS radio bearers in the target cell.

10. The source eNB sends the eNodeB Status Transfer message to the target eNB via the MME to convey the PDCP and Hyper Frame Number (HFN) status of the E-RABs for which PDCP status preservation applies. The source eNB may omit sending this message in the case that none of the E-RABs of the UE is treated with PDCP status preservation.

When there is MME relocation, the source MME sends this information to the target MME via the Forward Access Context Notification message. The source MME or the target MME (in the case that the MME is relocated) sends the information to the target eNB via the MME Status Transfer message.

11. The source eNB starts forwarding of downlink data from the source eNB towards the target eNB for bearers subject to data forwarding. This may be either direct forwarding (step 11a) or indirect forwarding (step 11b).

12. After the UE has successfully synchronized to the target cell, the UE sends a Handover Confirm message to the target eNB. Downlink packets forwarded from the source eNB may be sent to the UE. Uplink packets may be sent from the UE, which are forwarded to the target S-GW and on to the P-GW.

13. The target eNB sends a Handover Notify message to the target MME. The Handover Notify message may include TAI+ECGI and Local Home Network ID.

For SIPTO at the Local Network with stand-alone GW architecture, the target eNB includes the Local Home Network ID of the target cell in the Handover Notify message.

14. When the MME has been relocated, the target MME sends a Forward Relocation Complete Notification message to the source MME. The source MME in response sends a Forward Relocation Complete Acknowledge message to the target MME. Regardless whether MME has been relocated or not, a timer in source MME is started to supervise when resources in Source eNB are released (in addition, when the S-GW is relocated, also resources in Source S-GW is released).

Upon receipt of the Forward Relocation Complete Acknowledge message, the target MME starts a timer when the target MME allocated S-GW resources for indirect forwarding.

For all bearers that were not included in the Forward Relocation Request message sent in step 3, the MME releases the corresponding bearers by sending a Delete Bearer Command to the S-GW, or by sending the appropriate message to the SCEF.

15. The MME sends a Modify Bearer Request message to the target Serving GW for each PDN connection, including the PDN connections that need to be released. The Modify Bearer Request message may include eNodeB address and TEID allocated at the target eNodeB for downlink traffic on S1-U for the accepted EPS bearers, and idle state signaling reduction (ISR) Activated. When the PDN GW requested location information change reporting and/or User CSG information (determined from the UE context), the MME also includes the User Location Information IE (if it is different compared to the previously sent information) and/or User CSG Information IE in this message. When the UE Time Zone has changed, the MME includes the UE Time Zone IE in this message. In the case that S-GW is not relocated but the Serving Network has changed or in the case that the MME has not received any old Serving Network information from the old MME, the MME includes the Serving Network IE in this message. For the case that neither MME nor S-GW changed, when ISR was activated before this procedure, the MME maintains ISR. The UE is informed about the ISR status in the TAU procedure. In the case that the S-GW supports Modify Access Bearers Request procedure and in the case that there is no need for the S-GW to send the signaling to the P-GW, the MME may send Modify Access Bearers Request message per UE to the Serving GW to optimize the signaling. The Modify Access Bearers Request message may include eNodeB address and TEID allocated at the target eNodeB for downlink traffic on S1 U for the accepted EPS bearers, and ISR Activated.

The MME releases the non-accepted dedicated bearers by triggering the bearer release procedure. When the S-GW receives a DL packet for a non-accepted bearer, the S-GW drops the DL packet and does not send a Downlink Data Notification to the MME.

In the case that the default bearer of a PDN connection has not been accepted by the target eNB and there are other PDN connections active, the MME handles it in the same way as when all bearers of a PDN connection have not been accepted. The MME releases these PDN connections by triggering the MME requested PDN disconnection procedure.

When the Modify Bearer Request does not indicate ISR Activated the S-GW deletes any ISR resources by sending a Delete Bearer Request message to the other Core Network (CN) node that has bearer resources on the S-GW reserved.

16. When the S-GW is relocated, the target S-GW assigns addresses and TEIDs (one per bearer) for downlink traffic from the P-GW. The S-GW sends a Modify Bearer Request message per PDN connection to the P-GW. The Modify Bearer Request message may include S-GW addresses for user plane and TEID(s), Serving Network, and PDN Charging Pause Support Indication. The S-GW includes User Location Information IE and/or UE Time Zone IE and/or User CSG Information IE when they are present in step 15. The S-GW also includes Serving Network IE if it is present in step 4 or step 15. The S-GW allocates DL TEIDs on S5/S8 even for non-accepted bearers. The P-GW updates its context field and sends a Modify Bearer Response message to the target S-GW. The Modify Bearer Response message may include Charging Id, Mobile Station International Subscriber Directory Number (MSISDN), and PDN Charging Pause Enabled Indication. The MSISDN is included in the case that the PDN GW has it stored in its UE context. The P-GW starts sending downlink packets to the target S-GW using the newly received address and TEIDs. These downlink packets use the new downlink path via the target S-GW to the target eNB.

In the case that the S-GW is not relocated, but has received the User Location Information IE and/or UE Time Zone IE and/or User CSG Information IE and/or Serving Network IE from the MME in step 15, the S-GW informs the P-GW about these types of information by sending the Modify Bearer Request message to the PDN GW concerned. The Modify Bearer Request message may include User Location Information IE, UE Time Zone IE, User CSG Information IE, and Serving Network IE. A Modify Bearer Response message is sent to the S-GW.

In the case that the S-GW is not relocated and it has not received User Location Information IE, UE Time Zone IE, User CSG Information IE nor Serving Network IE from the MME in step 15, no message is sent in this step. Downlink packets from the S-GW are immediately sent on to the target eNB.

In the case that the S-GW is relocated, the P-GW send one or more "end marker" packets on the old path immediately after switching the path in order to assist the reordering function in the target eNB. The source S-GW forwards the "end marker" packets to the source eNB.

17. The S-GW sends a Modify Bearer Response message to the MME as a response to a Modify Bearer Request message. The Modify Bearer Response message may include Serving GW address and TEID for uplink traffic. Alternatively, the S-GW sends a Modify Access Bearers Response message as a response to a Modify Bearer Request message. The Modify Access Bearers Response message may include S-GW address and TEID for uplink traffic. In the case that the S-GW is unable to serve the MME Request in the Modify Access Bearers Request message without S5/S8 signalling other than a pause charging in the P-GW or without Gxc signaling when PMIP is used over the S5/S8 interface, the S-GW responds to the MME with indicating that the modifications are not limited to S1-U bearers. Further, the MME repeats its request using Modify Bearer Request message per PDN connection.

In the case that the S-GW does not change, the S-GW sends one or more "end marker" packets on the old path immediately after switching the path in order to assist the reordering function in the target eNB.

18. The UE initiates a TAU procedure when one of the predefined conditions is satisfied.

For a UE supporting CIoT EPS Optimizations, the EPS bearer status information shall be included in the TAU Request. The MME indicate the EPS bearer status to the UE in the TAU Accept and the UE locally releases any non-transferred bearer.

The target MME knows that it is a Handover procedure that has been performed for this UE as it received the bearer context(s) by handover messages, and therefore the target MME performs only a subset of the TA update procedure.

Specifically it excludes the context transfer procedures between source MME and target MME. In this case, the target MME sets the Header Compression Context Status for each EPS Bearer in the TAU Accept message based on information obtained in step 3.

19. When the timer started in step 14 expires, the source MME sends a UE Context Release Command message to the source eNB. The source eNB releases its resources related to the UE and responds with a UE Context Release Complete message. When the timer started in step 14 above expires and in the case that the source MME received the Serving GW change indication in the Forward Relocation Response message, the source MME deletes the EPS bearer resources by sending Delete Session Request messages to the Source S-GW. The Delete Session Request messages may include Cause, Linked EPS Bearer Identity (LBI) and Operation Indication. The operation Indication flag is not set, that indicates to the Source S-GW that the Source S-GW does not initiate a delete procedure towards the P-GW. The S-GW acknowledges with Delete Session Response messages. In the case that ISR has been activated before this procedure, the cause indicates to the S-GW that the S-GW deletes the bearer resources on the other old CN node by sending Delete Bearer Request message to that CN node.

20. In the case that indirect forwarding was used then the expiry of the timer at source MME started at step 14 triggers the source MME to send a Delete Indirect Data Forwarding Tunnel Request message to the S-GW to release the temporary resources used for indirect forwarding that were allocated at step 8.

21. In the case that indirect forwarding was used and the Serving GW is relocated, then the expiry of the timer at target MME started at step 14 triggers the target MME to send a Delete Indirect Data Forwarding Tunnel Request message to the target S-GW to release temporary resources used for indirect forwarding that were allocated at step 6.

S1 Release Procedure

When an eNB detects inactivity of a UE for a certain time in an EPS, the eNB may request S1 release to an MME, and accordingly, the MME may request a connection release between the UE and a core network by commanding S1-U release and RRC connection release to an S-GW.

This will be described in detail.

S1 release procedure is used to release the logical S1-AP signaling connection (over S1-MME) and all S1 bearer(s) (in S1-U) for a UE. This Procedure releases the S11-U bearer in Control Plane CIoT EPS optimization (except in the case of buffering in the MME), instead of the S1-U bearer. The procedure will move the UE from ECM-CONNECTED to ECM-IDLE in both the UE and the MME, and all UE related context information is deleted in the eNB. When the S1-AP signaling connection is lost (e.g. due to loss of the signaling transport or because of an eNB or MME failure), the S1 release procedure is performed locally by the eNB and by the MME. The S1 release procedure is performed locally by the eNB or by the MME, and each node performs locally its actions without direct signaling between eNB and MME.

The initiation of S1 Release procedure is either:
  eNB-initiated with cause: For example, Operations and Maintenance (O&M) Intervention, Unspecified Failure, User Inactivity, Repeated RRC signalling Integrity Check Failure, Release due to UE generated signalling connection release, CS Fallback triggered, Inter-RAT Redirection, etc.; or MME-initiated with cause: Authentication failure, detach, not allowed CSG cell (e.g. the CSG ID of the currently used CSG cell expires or is removed from the CSG subscription data), etc.

FIG. 8 is a diagram illustrating S1 release procedure in a wireless communication system to which the present invention may be applied.

1a. In certain cases, the eNB may release the UE's signaling connection before or in parallel to requesting the MME to release the S1 context release. For example, the eNB may initiate an RRC Connection Release for CS Fallback by redirection.

1b. When the eNB detects a need to release the UE's signaling connection and all radio bearers for the UE, the eNB sends an S1 UE Context Release Request message (including Cause) to the MME. Cause indicates the reason for the release (e.g. O&M intervention, unspecified failure, user inactivity, repeated integrity checking failure, or release due to UE generated signaling connection release).

Step 1 above is only performed when the eNB-initiated S1 release procedure is considered, and the MME-initiated S1 release procedure is performed from step 2.

For CP EPS optimization with data buffering in the MME, step 2 and step 3 are skipped.

2. The MME sends a Release Access Bearers Request (Abnormal Release of Radio Link Indication) message to the S-GW that requests the release of all S1-U bearers for the UE or the S11-U in CP CIoT EPS optimization if buffering is in the S-GW. This message is triggered either by an S1 Release Request message from the eNB, or by another MME event. The Abnormal Release of Radio Link Indication is included in the case that the S1 release procedure is due to an abnormal release of the radio link.

3. When the S-GW has received a Release Access Bearers Request, the S-GW releases all eNB related information (address and TEID(s)), or the MME TEIDs related information in CP CIoT EPS optimization (address and TEIDs), for the UE and responds with a Release Access Bearers Response message to the MME. Other elements of the UE's S-GW context are not affected. The S-GW retains the S1-U configuration that the S-GW allocated for the UE's bearer(s). The S-GW starts buffering downlink packets received for the UE and initiating the "Network Triggered Service Request" procedure, when downlink packets arrive for the UE. In CP CIoT EPS optimization, Downlink data triggers Mobile Terminated Data transport in NAS signaling.

4. The MME releases S1 by sending the S1 UE Context Release Command message (including Cause) to the eNB.

5. In the case that the RRC connection is not already released, the eNB sends a RRC Connection Release message to the UE in Acknowledged Mode. Once the message is acknowledged by the UE, the eNB deletes the UE's context.

6. The eNB confirms the S1 Release by returning an S1 UE Context Release Complete message (including ECGI, TAI) to the MME. With this, the signaling connection between the MME and the eNB for that UE is released. This step is performed promptly after step 4 (e.g. it should not be delayed in situations where the UE does not acknowledge the RRC Connection Release).

The eNB may include the Information On Recommended Cells And eNodeBs For Paging in the S1 UE Context Release Complete message. If available, the MME stores this information to be used when paging the UE.

The eNB includes Information for Enhanced Coverage, if available, in the S1 UE Context Release Complete message.

The MME deletes any eNB related information (eNB Address in Use for S1-MME, MME UE S1 AP ID and eNB UE S1AP ID) from the UE's MME context, but, retains the rest of the UE's MME context including the S-GW's S1-U configuration information (address and TEID(s)). All non-GBR EPS bearers established for the UE are preserved in the MME and in the S-GW.

In the case that the cause of S1 release is because of User I inactivity, Inter-RAT Redirection, the MME preserves the GBR bearers. In the case that the cause of S1 release is because of CS Fallback, for example, in the case that S1 release is because of Radio Connection With UE Lost, S1 signaling connection lost, eNodeB failure, and the like, the MME triggers the MME Initiated Dedicated Bearer Deactivation procedure for the GBR bearer(s) of the UE after the S1 Release procedure is completed.

The terms used in this document may be defined as below.

5G System (5GS): A system including 5G Access Network (AN), 5G Core network and User Equipments (UEs).

5G Access Network (5G-AN): An access network including New Generation Radio Access Network (NG-RAN) connected to 5G Core network and/or non-5G Access Network (AN).

New Generation Radio Access Network (NG-RAN): A radio access network that has common characteristics of being connected to 5GC, and supports one or more of the following options:
1) Standalone New Radio
2) New radio which is an anchor for supporting E-UTRA
3) Stand-alone E-UTRA (e.g., eNodeB)
4) Anchor for supporting new radio extension 5G Core Network (5GC): A core network connected to 5G access network Network Function (NF): A process function adopted in 3GPP or defined in 3GPP in a network, this process function includes defined functional behaviors and interfaces defined in 3GPP.

NF service: A function exposed by an NF through service-based interface, and consumed by other authenticated NF(s)

Network Slice: A logical network that provides specific network capability(s) and network characteristic(s)

Network Slice instance: A set of NF instance(s) that establishes a disposed network slice and required resource(s) (e.g., calculation, storage and network resource)

Protocol Data Unit (PDN) Connectivity Service: A service that provides an exchange of PDU(s) between a UE and a data network PDU Connectivity Service: A service that provides an exchange of PDU(s) between a UE and a data network PDU Session: An association between a UE and a data network that provides PDU Connectivity Service. The association types may include Internet Protocol (IP), Ethernet or unstructured.

5G System Architecture to which the Present Invention May be Applied 5G system is a technology advanced from $4^{th}$ generation LTE mobile communication technology, and a technology extended from a new Radio Access Technology (RAT), Long Term Evolution (LTE) through an evolution of the existing mobile communication network structure or Clean-state structure, and supports extended LTE (eLTE), non-3GPP (e.g., Wireless Local Area Network (WLAN)) access, and so on.

5G system architecture is defined to support a data connection and a service such that a deployment may use the technique such as Network Function Virtualization and Software Defined Networking. The 5G system architecture utilizes service-based interactions between a control plane (CP) network functions (NFs). A few important principles and concepts are as follows:

Distinguish CP functions and User Plane (UP) functions, and allow independent scalability, evolution and flexible deployment (e.g., centralized position or distributed (remote) position)

Modularize functional design (e.g., enable flexible and efficient network slicing)

Define such that procedures (e.g., a set of interactions between NFs) are applicable wherever as services If required, each NF is available to directly interact with another NF. The architecture does not preclude the use of an intermediate function to help route control plane messages.

Minimize interdependence between an Access Network (AN) and a Core Network (CN). The architecture is defined as a converged core network that has a common AN-CN interface that integrates different access types (e.g., 3GPP access and non-3GPP access)

Support unified authentication framework

To support "stateless" NFs where the "compute" resource is decoupled from the "storage" resource Support capability extension Support Concurrent access to local and centralized services. To support low latency services and access to local data networks, UP functions may be deployed close to an access network.

Support roaming with both Home routed traffic as well as Local breakout traffic (LBO) in the visited PLMN 5G system is defined as service-based, and the interaction between Network Functions (NFs) in the architecture for the 5G system may be represented as following two ways.

Service-based representation (FIG. 9): The network functions (e.g., AMF) in a Control Plane (CP) allows that other authenticated network functions access its own service. This representation includes point-to-point reference point, if it is required.

Reference point representation (FIG. 10): This represents an interaction between NF services in NFs described by point-to-point reference pint (e.g., N11) between two NFs (e.g., AMF and SMF).

FIG. 9 illustrates a wireless communication system architecture to which the present invention may be applied.

The service-based interface illustrated in FIG. 9 shows a set of services provided/exposed by a predetermined NF. The service-based interface is used in a control plane.

Referring to FIG. 9, 5G system architecture may includes various components (e.g., network functions), and FIG. 9 shows Authentication Server Function (AUSF), (Core) Access and Mobility Management Function (AMF), Session Management Function (SMF), Policy Control function (PCF), Application Function (AF), Unified Data Management (UDM), Data network (DN), User plane Function (UPF), Network Exposure Function (NEF), NF Repository Function (NRF), (Radio) Access Network ((R)AN), and User Equipment (UE), which correspond a part of them.

Each of the NFs supports the following functions.

AUSF stores data for authenticating a UE.

AMF provides a function for an access in a UE unit and mobility management, and an AMF may be connected to each UE, basically.

Particularly, AMF supports functions such as CN node signaling for mobility between 3GPP access networks, termination of Radio Access Network (RAN) CP interface (i.e., N2 interface), termination (N1) of NAS signaling, NAS signaling security (NAS ciphering and integrity protection), AS security control, registration management (Registration Area management), connection management, idle mode UE reachability (including control and performance of paging retransmission), mobility management control (subscription and policy), intra-system mobility and inter-system mobility support, Network Slicing support, SMF selection, Lawful Intercept (for interface to AMF event and L1 system), providing session management (SM) message between a UE and an SMF, Transparent proxy for routing SM message, Access Authentication, Access Authentication including roaming authority check, providing forwarding SMS message between a UE and an SMSF, Security Anchor Function (SEA), Security Context Management (SCM), and the like.

A part or the whole functions of AMF may be supported in a single instance of a single AMF.

DN means operator services, Internet access or 3rd party services, for example. DN transmits downlink Protocol Data Unit (PDN) to UPF or receives PDU transmitted from a UE.

PCF receives information of packet flow from an application server, and provides functions of determining policy such as mobility management, session management, and so on. Particularly, PCF provides unified policy framework for controlling network operations, provides policy rules that enable CP function(s) (e.g., AMF, SMF, etc.) to execute the policy rules, and supports functions such as Front End implementation for accessing subscription information in relation to policy determination in User Data Repository (UDR).

SMF provides session management function, and in the case that a UE has multiples sessions, each session may be managed by different SMF.

Particularly, SMF supports functions such as session management (e.g., session establishment, modification and release including tunnel maintenance between UPF and AN node), UE IP address allocation and management (including authentication, selectively), selection and control of UP function, traffic steering configuration for routing traffic to an appropriate destination in UPF, termination of interface toward Policy control functions, partial execution of policy and QoS control, Lawful Intercept (for SM event and interface to LI system), termination of SM part of NAS message, Downlink Data Notification, initiator of AN-specific SM information (forwarded to AN through N2 via AMF), SSC mode determination of a session, roaming function, and the like.

A part or the whole functions of SMF may be supported in a single instance of a single SMF.

UDM stores subscription data of users, policy data, and so on. UDM includes two parts, that is, application front end (FE) and User Data Repository (UDR).

FE includes UDM FE that takes charge of position management, subscription management, process of credential, and the like and PCF that takes charge of policy control. The UDR stores data required for functions provided by UDM-FE and policy profile required by PCF. The data stored in UDR includes subscription identifier, security credential, access and mobility related subscription data and user subscription data and policy data including session related subscription data. UDM-FE accesses to the subscription information stored in UDR, and supports functions such as Authentication Credential Processing, User Identification Handling, access authentication, registration/mobility management, subscription management, SMS management, and the like.

UPF forwards a downlink PDU received from a DN to a UE via (R)AN, and forwards an uplink PDN received from a UE to a DN via (R)AN.

Particularly, UPF supports functions such as anchor point for intra/inter RAT mobility, external PDU session point of interconnection toward Data Network, packet routing and forwarding, packet inspection and user plane part of policy rule execution, Lawful Inspection, traffic usage report, uplink classifier for supporting routing of traffic flow toward data network, Branching point for supporting multi-home PDU session, QoS handling for a user plane (e.g., packet filtering, gating, uplink/downlink rate execution), uplink traffic verification (SDF mapping between Service Data Flow and QoS flow), transport level packet marking in uplink and downlink, downlink packet buffering, downlink data notification triggering function, and the like. A part or the whole functions of UPF may be supported in a single instance of a single UPF.

AF interacts with 3GPP core network for service provision (e.g., supporting functions such as application influence on traffic routing, Network Capability Exposure approach, interaction with policy framework for policy control, etc.).

NEF provides services provided by 3GPP network functions, for example, 3rd party, internal exposure/re-exposure, application function, services for Edge Computing and means for exposing capabilities safely. NEF receives information from other network function(s) (based on exposed capability(s) of other network function(s)). NEF may store information received as structured data using standardized interface as a data storage network function. The stored information may be re-exposed to other network function(s) and application function(s) by NEF, and may be used for other purpose such as analysis, and the like.

NRF supports service discovery function. NRF receives NF discovery request from NF instance, and provides the information of the discovered NF instance to NF instance. In addition, NRF maintains usable NF instances and services provided by them.

(R)AN commonly refers to a new radio access network that supports both of evolved E-UTRA which is an evolved version of 4G radio access technology and a new radio access technology (NR: New Radio) (e.g., gNB).

gNB supports functions such as functions for radio resource management (i.e., Radio Bearer Control), Radio Admission Control, Connection Mobility Control, Dynamic allocation of resources to a UE in uplink/downlink (i.e., scheduling), IP (Internet Protocol) header compression, encryption of user data stream and integrity protection, selection of AMF when attachment of UE is performed in the case that routing from information provided to a UE to AMF is not determined, selection of AMF when attachment of UE is performed, user plane data routing toward UPF(s), control plane data routing toward AMF, connection setup and release, scheduling and transmission of paging message (generated from AMF), scheduling and transmission of system broadcast information (generated from AMF operating and maintenance (O&M)), measurement and measurement report configuration for mobility and scheduling, Transport level packet marking in uplink, session management, Network Slicing support, QoS flow management and mapping to data radio bearer, support of a UE in inactive mode, distribution function of NAS messages, NAS node selection function, radio access network sharing, Dual Connectivity, tight interworking between NR and E-UTRA, and the like.

UE means a user device. The UE may also be referred to as a terminal, a Mobile Equipment (ME), a Mobile Station (MS), and the like. In addition, the user device may be a portable device such as a notebook, a cell phone, a Personal Digital Assistant (PDA), a smart phone, a multimedia device, and the like, or may be non-portable device such as a Personal Computer (PC) and a vehicle mount device.

In FIG. 9, Unstructured Data Storage network function (UDSF) and Structured Data Storage network function (SDSF) are not shown, but all of the NFs shown in FIG. 9 may perform the UDSF, the SDSF and an interaction.

SDSF is structured data by a certain NEF, and an optional function for supporting functions of storing and retrieving information.

UDSF is unstructured data by a certain NEF, and an optional function for supporting functions of storing and retrieving information.

Followings illustrate service-based interfaces included in 5G system architecture shown in FIG. 9.

Namf: Service-based interface exhibited by AMF.
Nsmf: Service-based interface exhibited by SMF.
Nnef: Service-based interface exhibited by NEF.
Npcf: Service-based interface exhibited by PCF.
Nudm: Service-based interface exhibited by UDM.
Naf: Service-based interface exhibited by AF.
Nnrf: Service-based interface exhibited by NRF.
Nausf: Service-based interface exhibited by AUSF.

NF service is a sort of capability exposed through service-based interface to other NF (i.e., NF service consumer) by an NF (i.e., NF service provider). NF may expose one or more NF service(s). The following criteria are applied to define NF services.

NF services are exposed from information flow for describing end-to-end function.

Complete end-to-end message flow is described by a sequence of NF service invocation.

Two operations that NF(s) provide their own services through service-based interface are as follows:

i) "Request-response": Control plane NF_B (i.e., NF service provider) is requested to provide a specific NF service (execution of operation and/or providing information) from another control plane NF_A (i.e., NF service consumer). The NF_B responds NF service result based on information provided by the NF_A within the request.

In order to fulfill the request, the NF_B may consume NF services from other NF(s) alternately. In the Request-response mechanism, a communication is performed one-to-one between two NFs (i.e., consumer and provider).

ii) "Subscribe-Notify"

Control plane NF_A (i.e., NF service consumer) subscribes the NF service provided by another control plane NF_B (i.e., NF service provider). A plurality of control plane NFs may subscribe the same control plane NF service. The NF_B notifies the result of the NF service to the interested NF(s) subscribed in the NF service. The subscription request from a consumer may include a subscription request for notification which is triggered through a periodic update or a specific event (e.g., change of requested information, reaching to a specific threshold value, etc.). This mechanism also include the case that NF(s) (e.g., NF_B) subscribes a specific notification implicitly without explicit subscription request (e.g., due to successful registration procedure).

FIG. 10 illustrates a wireless communication system architecture to which the present invention may be applied.

In 3GPP system, a conceptual link that connects NFs in 5G system defines as a reference point. The following illustrates a reference point included in 5G system architecture shown as FIG. 10.

N1 (or NG1): Reference point between the UE and the AMF.
N2 (or NG2): Reference point between the (R)AN and the AMF.
N3 (or NG3): Reference point between the (R)AN and the UPF.
N4 (or NG4): Reference point between the SMF and the UPF.
N5 (or NG5): Reference point between the PCF and an AF.
N6 (or NG6): Reference point between the UPF and a Data Network.
N7 (or NG7): Reference point between the SMF and the PCF.
N24 (or NG24): Reference point between the PCF in a visited network and the PCF in a home network.
N8 (or NG8): Reference point between UDM and AMF.
NG9 (or NG9): Reference point between two Core UPFs.
N10 (or NG10): Reference point between UDM and SMF.
N11 (or NG11): Reference point between AMF and SMF.
N12 (or NG12): Reference point between AMF and AUSF.
N13 (or NG13): Reference point between UDM and Authentication Server function (AUSF).
N14 (or NG14): Reference point between 2 AMFs.
N15 (or NG15): Reference point between the PCF and the AMF in case of non-roaming scenario, and PCF and AMF in the visited network in case of roaming scenario.
N16 (or NG16): Reference point between two SMFs, (in roaming case between the visited SMF and the home network SMF).
N17 (or NG17): Reference point between AMF and EIR
N18 (or NG18): Reference point between a certain NF and UDSF
N19 (or NG19): Reference point between NEF and SDSF.

Meanwhile, FIG. 10 illustrates a reference model for the case that a UE accesses a DN using a PDU session, for the convenience of description, but the present invention is not limited thereto.

FIG. 11 illustrates a wireless communication system architecture to which the present invention may be applied.

FIG. 11 shows non-roaming 5G system architecture for a UE that simultaneously accesses to two (i.e., local and central) data networks (DNs) using multiple PDU session by using the reference point representation.

FIG. 11 exemplifies architecture for multiple PDU session for the case that two SMFs are selected for different PDU sessions. However, each SMF may have a capability of controlling both of the local UPF and the central UPF in a PDU session.

FIG. 12 illustrates a wireless communication system architecture to which the present invention may be applied.

FIG. 12 shows non-roaming 5G system architecture for the case that concurrent access is provided in a single PDU session with two (i.e., local and central) data networks (DNs) by using the reference point representation.

FIG. 13 illustrates a wireless communication system architecture to which the present invention may be applied.

FIG. 13 shows roaming 5G system architecture for the case of LBO scenario that has service-based interface in a control plane.

FIG. 14 illustrates a wireless communication system architecture to which the present invention may be applied.

FIG. 14 shows roaming 5G system architecture for the case of home routed scenario that has service-based interface in a control plane.

FIG. 15 illustrates a wireless communication system architecture to which the present invention may be applied.

FIG. 15 shows roaming 5G system architecture for the case of LBO scenario using the reference point representation.

FIG. 16 illustrates a wireless communication system architecture to which the present invention may be applied.

FIG. 16 shows roaming 5G system architecture for the case of home routed scenario using the reference point representation.

FIG. 17 illustrates NG-RAN architecture to which the present invention may be applied.

Referring to FIG. 17, New Generation Radio Access Network (NG-RAN) includes NR NodeB(s) (gNR(s)) and/or eNodeB(s) (eNB(s)) that provides terminals of user plane and control plane protocols toward a UE.

Between gNBs or between eNBs connected to gNB(s) are interconnected using Xn interface. gNB(s) and eNB(s) are also connected to 5GC using NG interface, and more particularly, connected to AMF using NG-C interface (i.e., N2 reference point) which is a control plane interface between NG-RAN and 5GC, and connected to UPF using NG-U interface (i.e., N3 reference point) which is a user plane interface between NG-RAN and 5GC.

FIG. 18 is a diagram illustrating wireless protocol stack in a wireless communication system to which the present invention may be applied.

FIG. 18(*a*) illustrates a wireless interface user plane protocol stack between a UE and a gNB, and FIG. 18(*b*) illustrates a wireless interface control plane protocol stack between a UE and a gNB.

The control plane means a passage through which control messages are transmitted, which a UE and a network use for managing a call. The user plane means a passage through which data generated in an application layer, e.g., voice data or internet packet data is transmitted.

Referring to FIG. 18(*a*), the user plane protocol stack may be divided into a first layer (Layer 1) (i.e., physical layer (PHY) and a second layer (Layer 2).

Referring to FIG. 18(*b*), the control plane protocol stack may be divided into a first layer (e.g., PHY layer), a second layer, a third layer (i.e., radio resource control (RRC) layer) and a Non-Access Stratum (NAS) layer.

The second layer is divided into Medium Access Control (MAC) sub layer, Radio Link Control (RLC) sub layer, Packet Data Convergence Protocol (PDC) sub layer and Service Data Adaptation Protocol (SDAP) sub layer (for user plane).

The radio bearer is classified into two groups: data radio bearer (DRB) for user plane data and signaling radio bearer (SRB) for control plane data.

Hereinafter, each layer of the control plane and the user plane of a radio protocol is described.

1) PHY layer, which is the first layer, provides information transfer services to a higher layer using physical channel. The PHY layer is connected to MAC layer located in higher level through a transport channel, and data is transmitted between MAC sub layer and PHY layer through the transport channel. The transport channel is classified according to which data is transmitted by which characteristics through radio interface. Further, between different PHY layers, that is, between PHY layer of a transmitter and PHY layer of a receiver, data is transmitted through physical channel.

2) MAC sub layer performs mapping between a logical channel and a transport channel; multiplication/inverse-multiplication of MAC Service Data Unit (SDU) belonged to one or different logical channel to/from a transport block (TB) forwarded to/from PHY layer through a transport channel; scheduling information reporting; error correction through hybrid automatic repeat request (HARQ); priority handling between UEs using dynamic scheduling; priority handling between logical channels of a UE using logical channel priority; padding.

Different types of data forwards a service provided by MAC sub layer. Each logical channel type defines which type of information is forwarded.

The logical channel is classified into two groups: Control Channel and Traffic Channel.

i) The control channel is used for forwarding control plane information only, and as follows.

Broadcast Control Channel (BCCH): A downlink channel for broadcasting system control information Paging Control Channel (PCCH): A downlink channel for forwarding paging information and system information change notification Common Control Channel (CCCH): A channel for transmitting control information between a UE and a network. This channel is used for UEs that do not have an RRC connection with a network.

Dedicated Control Channel (DCCH): A point-to-point bi-directional channel for sending dedicated control information between a UE and a network.

ii) The traffic channel is used for using user plane information only:

Dedicated Traffic Channel (DTCH): A point-to-point channel for forwarding user information, dedicated by a single UE. The DTCH may be existed in both of uplink and downlink.

In downlink, a connection between a logical channel and a transport channel is as below.

BCCH may be mapped to BCH. BCCH may be mapped to DL-SCH. PCCH may be mapped to PCH. CCCH may be mapped to DL-SCH. DCCH may be mapped to DL-SCH. DTCH may be mapped to DL-SCH.

In uplink, a connection between a logical channel and a transport channel is as below. CCCH may be mapped to UL-SCH. DCCH may be mapped to UL-SCH. DTCH may be mapped to UL-SCH.

3) RLC sub layer supports three types of transmission modes: Transparent Mode (TM), Unacknowledged Mode (UM), and Acknowledged Mode (AM).

The RLC configuration may be applied for each logical channel. For SRB, TM or AM mode is used, on the other hand, for DRB, UM or AM mode is used.

RLC sub layer performs forwarding higher layer PDU; independent sequence numbering with PDCP; error correction through automatic repeat request (ARQ); segmentation and re-segmentation; reassembly of SDU; RLC SDU discard; RLC re-establishment.

4) PDCP sub layer for a user plane performs Sequence Numbering; header compression and decompression (only for Robust Header Compression (RoHC)); user data forwarding; reordering and duplicate detection (in the case that forwarding to higher than PDCP layer is required); PDCH PDU routing (for split bearer); PDCP SDU retransmission;

ciphering and deciphering; PDCP SDU discard; PDCP re-establishment and data recovery for RLC AM; PDCP PDU copy.

PDCP sub layer for a control plane performs, additionally, Sequence Numbering; ciphering; deciphering and integrity protection; control plane data forwarding; duplication detection; PDCP PDU copy.

When duplication of radio bearer is configured by RRC, in order to control the duplicated PDCP PDU(s), additional RLC entity and additional logical channel are added to the radio bearer. In the PDCP, the duplication includes a transmission of the same PDCP PDU(s) twice. Once is forwarded in the original RLC entity, and the second is forwarded in the additional RLC entity. At this time, the original PDCP PDU and the corresponding copy are not transmitted in the same transport block. Different two logical channels may be belonged to the same MAC entity (for CA) or belonged to different MAC entities (for DC). For former case, logical channel mapping restriction is used to guarantee such that the original PDCP PDU and the corresponding copy are not transmitted in the same transport block.

5) SDAP sub layer performs i) mapping between QoS flow and data wireless bearer and ii) QoS flow ID marking in downlink and uplink packets.

A single protocol entity of SDAP is configured for each individual PDU session, but exceptionally, two SDAP entities may be configured for the Dual Connectivity case.

6) RRC sub layer performs broadcast of the system information in relation to Access Stratum (AS) and Non-Access Stratum (NAS); paging initiated by 5GC or NG-RAN; establishment, maintenance and release (additionally, includes modification and release of carrier aggregation, in addition, includes modification and release of Dual Connectivity between E-UTRAN and NR or within NR, additionally) of an RRC connection between a UE and a NG-RAN; security function including key management; establishment, configuration, maintenance and release of SRB(s) and DRB(s); handover and context forwarding; UE cell selection and re-release and cell selection/reselection control; mobility function including the mobility between RATs; QoS management function, UE measurement report and report control; detection of radio link failure or recovery from radio link failure; NAS message forwarding from NAS to UE and NAS message forwarding from UE to NAS.

Session and Service Continuity (SSC)

In 3GPP SA2, a discussion of a method for supporting a session according to a UE mobility and service continuity has been progressed.

In the next generation system (e.g., 5G system), a solution for supporting three types of SSC mode has been discussed.

This solution assumes PDU session existed between user plane functions with a UE (hereinafter, this is referred to as terminating user-plane function, but may be replaced by UPF described above). TUPF terminates 3GPP user plane and interfaces with a data network.

1) SSC Mode Definition

The next generation system supports the following SSC mode.

SSC mode 1: The same TUPF is maintained regardless of the access technology (e.g. RATs and cells) a UE is using to access the network.

SSC mode 2: The same TUPF is only maintained across a subset (i.e. one or more, but not all) of the access network attachment points (e.g. cells and RATs), referred to as the serving area of the TUPF. When the UE leaves the serving area of a TUPF, the UE will be served by a different TUPF suitable for the UE's new point of attachment to the network.

SSC mode 3: In this mode, the network allows the establishment of UE connectivity via a new TUPF to the same data network (DN) before connectivity between the UE and the previous TUPF is terminated. When trigger conditions apply, the network selects a target TUPF suitable for the UE's new point of attachment to the network. While both TUPFs are active, the UE either actively rebinds applications from the previous to the new address/prefix, or alternatively, the UE waits for flows bound to the previous address/prefix to end.

2) Mode Selection and Network Support

In relation to Mode selection and network support, the following principles are applied:

When PDU session is request, a UE may indicate SSC mode which is requested as a part of PDU session setup signaling to a network. The method of determining SSC mode requested by the UE is described below.

A serving network receives a list and default SSC mode supported for each data network for each subscriber as a part of subscription information from subscription database.

The serving network selects SSC mode by accepting SSC mode requested based on subscription information and/or local configuration or modifying the requested SSC mode.

Unless the UE provides SSC mode when requesting a new PDU session, a network selects basic SSC mode enumerated in the subscription information (for connecting data network) or applies a local configuration for selecting SSC mode.

After selecting SSC mode, the network indicates that the selected SSC mode is already used in the UE or by another PDU session by (a) accepting PDU session request from the UE or indicating the selected SSC mode accepted by the UE, (b) by rejecting the PDU session request and transmitting the selected SSC mode and cause value to the UE by the network.

SSC mode applies for each PDU session. The UE requests different SSC modes to different PDU sessions. That is, different PDU sessions activated for the same UE simultaneously may have different SSC mode.

SSC mode is not changed during a lifetime of the PDU session.

TUPF selection: When TUPF for PDU session is selected, the network considers the current attachment point of the UE and the requested SSC mode.

3) SSC Mode 1

In relation to SSC mode 1, the following principles are applied:

The allocated TUPF is maintained during a lifetime of PDU session. That is, TUPF is not changed by a network.

4) SSC Mode 2

In relation to SSC mode 2, the following principles are applied:

Redirection trigger to different TUPFs: A network determines whether TUPF allocated to PDU session of UE is required to be redirected based on UE mobility and local policy (i.e., information of serving area of the allocated TUPF).

Redirection procedure: A network releases a user plane path associated with the current TUPF first, then sets up a user plane path corresponding to the new TUPF, and redirects traffic of a UE to different TUPFs. The following two solutions are used. One is that PDU session is preserved when reallocating TUPF. Another is that a network disconnects PDU session of the UE corresponding to the current TUPF, and requests to reactivate PDU session (as a result of selecting new TUPF) immediately to the UE. During this process, the UE maintains the attached state. The network selects TUPF based on the current attachment point of the UE toward the network.

5) SSC Mode 3

In relation to SSC mode 3, the following principles are applied:

Redirection trigger to different TUPFs: A network determines whether TUPS allocated to PDU session of a UE is required to be redirected based on a local policy (i.e., information of a serving area of an allocated TUPF).

Redirection procedure: A network indicates whether traffic on an activated PDU session of a UE is required to be redirected to the UE. The network starts a timer also, and indicates a timer value to the UE. The user plane path is established toward a new TUPF. The following two types of solutions are used. One is that PDU session is reused for an additional user plane path. Another is that additional PDU session is reestablished. The network selects TUPF based on a current attachment point of the UE toward the network. In the case that the UE transmits a request for additional PDU session to the same DN without a prior indication from the network that the activated PDU session is not required to be redirected, the network rejects the request of the UE.

In the case that a new user plane path associated with new TUPF is established, the UE may perform one of the following options.

Option 1: The UE redirects the application flow bound with the prior TUPF to new TUPF actively (e.g., by using higher layer session continuity mechanism). When the UE complete the redirection of the application flow to the new TUPF, the previous TUPF is released.

Option 2: The UE steers the new application flow to the new TUPF. The previous flow via the previous TUPF continues until the flow is terminated. When all flows that use the previous TUPF are terminated, the previous TUPF is released. When option 2 is used, multi-homed PDU session may be used for transmitting the application flow which is bound to the previous TUPF. The tunnel between the previous TUPF and the new TUPF is used for forwarding the flow.

In the case that the previous TUPF is not released when the timer expires, or in the case that the network detect that the previous TUPF is inactivated, the network releases the previous TUPF.

Session Management for Each PDU Session

This solution is based on the following principles:

SMF and AMF are divided into different network functions. In the case that a UE is registered in multiple network slice instance, the UE may be serviced by multiple SMFs. That is, multiple PDU session is established.

Multiple PDU session (toward the same or different network slices) is established for a given UE. One PDU session may be in idle state or active state.

UP connection (including data wireless connection and N3 tunnel establishment) may be activated for a single PDU session. The UP connection for different PDU session (toward the same or different network instances) may be independently activate/deactivate. Procedure for PDU session activation and deactivation is proposed.

Here, the PDU session activation is a transmission in "Active" session state in SMF, and a UP connection is established. The PDU session deactivation is switch to "idle" session state in SMF, and a UP connection is released/deactivated.

Similar to the signaling management (i.e., Active/Idle switch management) in the conventional GPRS and EPS, it is not excluded to perform SM together for all existing PDU sessions. It may be based on subscription information and UE capability on whether to perform activation of all PDU sessions or perform activation of independent PDU session.

FIG. 19 illustrates reference architecture of a wireless communication system to which the present invention may be applied.

FIG. 19 illustrates the reference architecture including three PDU sessions as different network slices having independent SMF.

Common Control Plane Network Function (CCNF) may include mobility management function (AMF) or AAA function. Dedicated Control Plane Network Function (Ded. CP NF) may include session management function (SMF), and may include policy control function (PCF) optionally.

FIG. 20 illustrates a session/mobility state machine in a wireless communication system to which the present invention may be applied.

FIG. 20 illustrates multiple session state machine (one for established session) and a single mobility state machine.

FIG. 20 shows an independent session state machine for each existed session (i.e., network slice or PDU session). The session state machine may be maintained as a part of SM context of a UE in SMF. The session state machine may also be maintained in AMF.

CCDN (e.g., AMF) knows session state (Idle or Active) for all established PDU sessions. Additionally, in addition to mobility context, AMF also maintains state information for all established PDU session.

For example, in the case that a single PDU session is deactivated (i.e., UP connection is released but context is maintained in UE, SMF/UPF), the AMF knows that the corresponding SMF should not be updated when a UE moves or change RAN node. On the contrary, in the case that a PDU session is activated, the AMF knows that the corresponding SMF should be updated with detailed information of a new (R)AN node (e.g., IP address, tunnel identifier, transport port ID or other parameters) whenever (R)AN mode is changed due to UE mobility.

FIG. 21 is diagram illustrating a session activation procedure in a wireless communication system to which the present invention may be applied.

FIG. 21 illustrates a session activation procedure triggered by a downlink data transmission (i.e., for UE Mobile Terminate (MT)) independent from other PDU session.

1. The UPF2 initiates Activate session request procedure for the establishment of UP connection.

2. The SMF2 initiates Activate session request procedure towards the CCNF (e.g. MMF). SMF2 includes session ID, QoS parameters, paging priority and UPF ID (needed for NG3 tunnel establishment, e.g. IP address, tunneling endpoint ID and/or transport layer port ID). In the case that the CCSF has another Activate session request procedure in progress with other SMF (e.g. SMF1) and the Activate session request message from the SMF2 has equal or less paging priority than the one in progress, the CCSF does not initiates new paging procedure to the UE.

3-4. In the case that the AMF is in Standby state, the AMF initiates the paging procedure to the UE. The Paging message includes the session ID corresponding to the DL packets arrived to the UPF2. In the case that the AMF is in Ready state (i.e. there is an active session on going with UPF1), the CCNF sends service notification message to the UE over the NG1 interface instead of performing paging procedure.

4. The UE sends the Service Request message to the CCNF. The Service Request message includes the session ID in the case that it was present in step 3.

5-7. The CCNF (e.g. AMF) performs UE context setup procedure towards the RAN node. The SM state in the UE for this PDU session changes to "Active" and the UE is able to receive/send data.

8. AMF responds to step 2 towards SMF2 including the RAN node UP information for NG3 tunnel establishment. When the CCNF has Activate session request messages received from multiple SMFs, then multiple Activate session response messages are responded to corresponding SMFs.

9. SMF2 updates UPF2 with the information needed for NG3 tunnel establishment.

FIG. 22 is a diagram illustrating a session activation procedure in a wireless communication system to which the present invention may be applied.

FIG. 22 illustrates a session activation procedure triggered by an uplink data transmission (i.e., for UE Mobile Originated (MT)) independent from activation of other PDU session.

1. Due to UL data for PDU session 2, the UE initiates RRC connection establishment with RAN node to transmit an initial NAS message. In the case that UE has active session (i.e., Ready state), the UE skips this step and performs step 3.

2. In the case that the UE does not have any active sessions, the UE sends the Service Request message to the CCNF. The Service Request message includes the session ID that UE wants to activate.

3. In the case that the UE has an active session (i.e., Ready state), the UE sends NAS SM session activation message which includes the session ID that UE wants to activate.

4-6. The CCNF (e.g. AMF) performs Activate session procedure with the SMF2. SMF2 updates the UPF2, if needed, and replies to AMF with the corresponding stored QoS parameters and UPF ID.

7-9. The CCNF (e.g. MMF) performs UE context setup procedure to the RAN node. The SM state in the UE for this PDU session changes to "Active" and the UE is able to receive/send data for this PDU session.

10-12. AMF performs Update session procedure to towards the associated SMF2 to inform SMF2 and UPF2 about the RAN node UP information for NG3 tunnel establishment.

The procedure for session deactivation includes the release of the UP connection (data radio connection and NG3 connection/tunnel), whereas the UE's context in the SMF and the NAS SM context in the UE are kept, however the state is "Idle". The session deactivation procedure may be initiated by the RAN node.

Interaction Between Access Network (AN) and Core Network (CN) in Relation to Activation for Each PDU Session In an evolved packet system (EPS), when a PDN connection is established and a bearer is generated, after a UE enters Idle mode (e.g., EPS Connection Management (ECM)-IDLE mode), all PDN connections are activated without regard to whether it is the PDN connection for a service that the UE wants when a connection setup is performed using a service request procedure, and the like.

In addition, when a UE handovers from a connected mode (e.g., ECM-CONNECTED mode) due to mobility, all PDN connections set to the UE move (i.e., handover).

However, in 5 Generation (5G) system, a concept of activation (and/or deactivation) for each Protocol Data Unit (PDU) session has been introduced.

In this case, when a UE switches from an idle mode to a connected mode, the UE may request that a PDU session wanted by the UE is activated. In addition, even for a UE reception call, it is available to activate (and/or deactivate) for each PDU session in a network. Accordingly, even in the case of performing handover, all PDU sessions established for the corresponding UE is not moved (i.e., handover) during the handover procedure, but only an activated PDU session handovers.

FIG. 23 is a diagram illustrating an activation procedure for a PDU session in a wireless communication system to which the present invention may be applied.

1-2. A UE may have two PDU sessions. In FIG. 23, PDU session 1 exemplifies a PDU session established through UPF 1, and PDU session 2 exemplifies a PDU session established through UPF 2.

3. Next, when Inactivity of the UE is detected due to reception/transmission terminate, N2 release procedure is performed. At this time, the UE is switched to an idle mode.

4-1. Later, in the case that the UE wants a service again, the UE may transmit a Service Request message with a session Identifier (ID) that wants an activation to source AMF.

FIG. 23 exemplifies that the UE wants an activation of PDU session 1 only, and includes only session ID 1 in the Service Request message.

In this case, it means that the UE does not request (to activate) both of PDU sessions 1 and 2, but requests to activate PDU session 1 only that the UE wants to have a service.

4-2. The source AMF transmits a Session Management (SM) Request message to SMF 1. The SM Request message may include PDU session ID and gNB Identifier (ID) in which activation is requested, and cell Identifier (ID).

FIG. 23 exemplifies the case that only session ID 1 included in the Service Request message is included in the SM Request message.

4-3. SMF 1 transmits an SM Request ACK message to the source AMF in response to the SM Request message of step 4-2. The SM Request ACK message may PDU session ID which is a target of activation and Quality of Service (QoS) rule for the corresponding PDU session.

4-4. The source AMF transmits a Context Setup Request message to the source gNB. The Context Setup Request message may include PDU session (i.e., setup PDU session) which is a target of activation, QoS rule for the corresponding PDU session and security information.

Through steps 4-3 and 4-4, the context for PDU session 1 is forwarded to the gNB via the source AMF in SMF 1.

4-5. The source gNB activates Data Radio Bearer (DRB). That is, through this step, radio resource reservation and allocation are progressed between the gNB and the UE.

4-6. The source gNB transmits a Context Setup Response message to the source AMF in response to the Context Setup Request message. The Context Setup Request message may include accepted PDU and QoS rule accepted for the corresponding PDU session.

4-7. The source AMF transmits an SM Request message to SMF 1. The SM Request message may include PDU session ID which is a target of activation and QoS rule accepted for the corresponding PDU session.

Through steps 4-6 and 4-7, the gNB may forward configurable QoS rule information to SMF 1 through the AMF.

4-8. SMF 1 transmits a Session Activation Request message to UPF 1 (i.e., IP anchor). The Session Activation Request message may include PDU session ID which is a target of activation and Quality of Service (QoS) rule for the corresponding PDU session.

4-9. UPF 1 transmits a Session Activation ACK message to SMF 1 in response to the Session Activation Request message.

4-10. SMF 1 transmits an SM Request ACK message to the source AMF in response to the SM Request message.

Through the operations of steps 4-7 to 4-10, interfaces are setup between the UE and the gNB and between gNB and UPF 1 for the service of PDU session 1.

Later, via UPF 1, data transmission/reception for PDU session 1 is available.

As described above, when handover is performed due to the UE's mobility in a connected mode, all PDU sessions configured to the UE move (i.e., handover). That is, without regard to whether it is a PDN connection for the service that the UE wants continually after handover, all PDN connections handover. Accordingly, a connection release procedure is performed for the PDN connection for the service that the UE does not want after handover, and accordingly, unnecessary operation is performed.

In order to solve the disadvantage, the present invention proposes a method for performing handover, when a UE in a connected mode performs handover, the UE does not move (i.e., handover) all PDU sessions established for the corresponding UE during handover procedure, but performs handover of only an activated PDU session.

Particularly, in 5G system, since the mobility management of a UE is performed by AMF and the session management of a UE is performed by SMF, a problem occurs that the AMF cannot know which PDU session is activated among the established PDU sessions for the corresponding UE.

In addition, the session management of a UE is performed by SMF, but the SMF for managing the PDU session for each established PDU session may be different. In such a situation, in the case that handover is performed for all PDU sessions that are established for the UE, there is a problem that unnecessary signaling occurs in SMF managing the inactivated PDU sessions.

Further, similar to the above case, in the case that handover is performed for all PDU sessions that are established for the UE, a time for unnecessary processing/signaling is consumed in the SMF managing the inactivated PDU sessions, and there is a problem that the handover procedure is unavailable to be performed quickly.

Accordingly, the present invention proposes a method for performing handover only for an activated PDU session among the PDU sessions established for a UE in AMF in which mobility of the UE is managed.

FIG. 24 is a diagram illustrating a method for performing handover according to an embodiment of the present invention.

FIG. 24 exemplifies the case that not all of AMF, SMF/UPF are changed, but the present invention may be applied to the case that at least one of {AMF, SMF, UPF} is changed.

In FIG. 24, it is assumed the case that two PDU sessions are established to a UE and N2 based handover is performed according to the mobility of the UE in a state that one of the two PDU sessions, which is configured to the UE according to activation for each PDU session is activated. The N2 based handover means the handover between RANs (i.e., gNBs) without mutual interface or the handover through N2 interface in the case that change of AMF is required.

1. A source gNB (or source radio access network (RAN)) determines handover to a target gNB (or target RAN) according to the mobility of the UE.

In addition, the source gNB determines an execution of N2 based handover owing to absence of an interface between the target gNB and the source gNB or owing to AMF change, and the like. That is, the source gNB determines to trigger relocation through N2 interface.

2. The source gNB transmits a Handover Required message to a serving AMF (or source AMF).

At this time, the source gNB includes an activated PDU session Identifier(s) (ID(s)) that the source gNB serves in the field that the AMF may receive and process in the Handover Required message. In other words, PDU session IDs for all PDU sessions (i.e., all existing PDU sessions that have activated user plane connections) processed by the source gNB may be included in the Handover Required message. Here, the activation of user plane connections of the PDU session causes activation of user plane connection between the UE and a core network (i.e., interface/reference point among data radio bearer, N3 (gNB (or RAN)) and UPF). Furthermore, deactivation of user plane connections of the PDU session causes deactivation of data radio bearer and N3 tunnel. At this time, a user plane connection of different PDU sessions may be independently activated.

The PDU session ID included in the Handover Required message may indicate that handover is requested by the source gNB for the corresponding PDU session(s).

In addition, the source gNB may include an address of the target gNB (or Identifier (ID) of the target gNB) and the like in the Handover Required message such that the AMF may determine whether to relocated the SMF.

Further, the source gNB may generate Signaling Management (SM) transparent container transmittable to the SMF for each activated PDU session, and include it in the Handover Required message. Such a transparent container may be forwarded to the target gNB with being transparent to a core network (i.e., without modification/change in the core network), and may be used by the target gNB.

3. The AMF transmits the received corresponding SM transparent container with being included in the SM message (e.g., SM Request message) to the SMF corresponding (associated) to the PDU session ID included in the Handover Required message.

The AMF stores a connection relation between the PDU session ID and SMF address (or SMF Identifier (ID)) when generating (establishing) PDU session before. That is, the SMF stores association between the PDU session ID and the SMF (i.e., SMF ID). However, it is assumed that the AMF does not store a factor on whether to activate the corresponding PDU session and the PDU session related context.

FIG. 24 illustrates that PDU session ID 1 is associated with SMF 1 and PDU session ID 2 is associated with SMF 2.

Since PDU session ID 1 is included in the Handover Required message in step 2, the AMF transmits the SM message to SMF 1 associated with PDU session ID 1.

As another example, in the case that PDU session ID 2 is included in the Handover Required message, the AMF may transmit the SM message to SMF 2 associated with PDU session ID 2. As another example, in the case that both of PDU session ID 1 and PDU session ID 2 are included in the Handover Required message, the AMF may transmit the SM message to each of SMF 1 associated with PDU session ID 1 and SMF 2 associated with PDU session ID 2.

Further, the SM message may further include a handover type, forwarding path information, target gNB ID & address, and so on.

Meanwhile, as described above, FIG. 24 exemplifies the handover procedure for the case that the AMF is not changed. However, in the case that the AMF is changed, the SM message may be transmitted to the SMF by a target AMF.

4. SMF 1 that receives the SM message (e.g., SM Request message) transmits the address of UPF 1 for uplink N3 (i.e., interface between RAN and UPF) path configuration and Quality of Service (QoS) information of a PDU session with being included in an SM Request Acknowledge message.

In the case that it is successful (i.e., handover for the PDU session is accepted), the SMF may include the cause of indicating success in the SM message (i.e., SM Request Acknowledge message).

5. The AMF transmits a Handover Request message to the target gNB.

The Handover Request message may include the information received from the SMF in step 4 (e.g., a list of PDU sessions to setup (i.e., list of PDU sessions in which handover is accepted), QoS rule for the PDU session belonged to the list of the corresponding PDU sessions, UPF address for uplink path configuration, and the like).

6. The target gNB determines whether it is configurable for the received PDU session and whether QoS is allowable, and transmits a Handover Request Acknowledge message to the AMF in response to the Handover Request message.

The Handover Request Acknowledge message may include Target to Source transparent container including radio related information which is transparently transmitted from the target RAN to the source RAN through a core network, and Accepted PDU session with accepted QoS rule information.

7. The AMF transmits a Handover Command message to the source gNB.

The Handover Command message may include Target to Source transparent container and PDU setup list for PDU sessions to be set up.

8. Next, the handover execution process is performed. That is, steps such as UE's movement to a target cell, radio bearer configuration, and so on.

Hereinafter, the Handover Required message will be described in more detail.

The Handover Required message is transmitted to the AMF by the source gNB in order to request preparation of resources in a target.

Table 2 represents contents of the Handover Required message.

TABLE 2

| IE/Group Name | Presence | Range | IE type and reference | Meaning description | Threshold | Designated threshold |
|---|---|---|---|---|---|---|
| Message Type | M | | 9.2.1.1 | | YES | reject |
| AMF UE S1AP ID | M | | 9.2.3.3 | | YES | reject |
| gNB UE S1AP ID | M | | 9.23.4 | | YES | reject |
| Handover Type | M | | 9.2.1.13 | | YES | reject |
| Cause | M | | 9.2.13 | | YES | ignore |
| Target ID | M | | 9.2.1.6 | | YES | reject |
| Source to Target Transparent Container | M | | 9.2.1.56 | | YES | reject |
| PDU session To Be Setup List | | 1 | | | YES | reject |
| >PDU session ID | | 1 ... <maxnoofPDUsession> | | | EACH | reject |

Referring to Table 2, IE/Group Name represents the name of IE or information element (IE) group.

'M' in the Presence field is a mandatory IE, and represents that it is IE/IE group included in the message always. 'O' is an optional IE, and represents that it is IE/IE group that may be included or not included in the message. 'C' is a conditional IE, and represents that it is included in the message only when a specific condition is satisfied.

The Range field represents the number of repetition of repeated IEs/IE groups.

The IE type and reference field represents a type of the corresponding IE (e.g., ENUMERATED, INTEGER, OCTET STRING, etc.), and in the case that a range of the value included in the corresponding IE is present, it represents the range of the value.

The Criticality field represents criticality information applied to IE/IE group. The criticality information means the way of operation in a receiver in the case that a part or the whole IE/IE group is not understood. '-' means that the criticality information is not applied, and 'YES' means that the criticality information is applied. 'GLOBAL' represents that IE and repetition of the corresponding IE have one piece of criticality information. 'EACH' represents intrinsic criticality information is included in each repetition of IE.

The Assigned Criticality field represents actual criticality information.

As represented in Table 2, the Handover Required message may include Message Type IE, AMF UE S1AP ID IE, gNB UE S1AP ID IE, Handover Type IE, Cause IE, Target ID IE, Source to Target Transparent Container IE, PDU session To Be Setup List IE, and PDU session ID IE.

The Message Type IE identifies a transmitted message intrinsically.

The AMF UE S1AP ID identifies UE association through N2 interface in the AMF.

The gNB UE S1AP ID identifies UE association through N2 interface in the gNB.

The Handover Type IE indicates a type of handover in a source side.

The purpose of the Cause IE is for indicating the cause of a specific event for N2AP protocol.

The Target ID IE identifies a target of handover. The target ID may be an identifier of the gNB, for example.

The Source to Target Transparent Container IE is IE used for forwarding radio related information from a handover source to a handover target through a core network transparently. This IE is forwarded from a source RAN node to a target RAN node.

The PDU session To Be Setup List includes a list of PDU session IDs.

The PDU session ID IE includes a PDU session ID of an activated PDU session. The PDU session ID may have a value among values up to a maximum PDU session numbers (maxnoofPDUsession).

That is, the source gNB includes activated PDU session ID(s) owned in the Handover Required message.

The AMF that receives the Handover Required message sends an SM message (e.g., SM request message) to the SMF associated with the PDU session ID included in the PDU session To Be Setup List (i.e., the AMF stores SMF connection relation (association) to forward an SM message (e.g., SM request message) for each PDU session ID through PDU session establishment procedure), and notifies a necessity of handover of the corresponding PDU session. That is, the PDU session ID indicates a PDU session candidate of handover.

The SMF that receives this transmits an operation for N3 interface setup and QoS rule to enforce in the gNB with being included in an SM message (e.g., SM request ACK) to the AMF. The AMF that receives it transmits the handover request message to the target gNB.

In the case that the source gNB does not notify the activated PDU session ID in the Handover Required message to the AMF, the AMF needs to keep the context for activated PDU session always and transmit an SM message (e.g., SM request message) to the corresponding SMF associated with the activated PDU session. However, such an operation causes a problem, which is against the functional separation between the AMF and the SMF.

In addition, in the case that the AMF does not keep the context for activated PDU session and the source gNB does not notify the activated PDU session ID in the Handover Required message, a problem occurs that the AMF queries a state of the activated PDU session to all SMFs in which a PDU session is established, and then an operation needs to be performed for the handover required again to the corresponding SMF associated with the activated PDU session.

In order to solve the problem, when a gNB that knows activated PDU session information requests handover (i.e., when the gNB transmits Handover Required message), an embodiment of the present invention proposes a method of requesting only handover for it by transmitting the activated PDU session information, different from the conventional system (e.g., LTE system). Owing to this, the AMF is not required to keep the SM context (i.e., context for the activated PDU session), and it may be prevented unnecessary signaling such as the AMF queries the activated PDU session to the SMF.

Meanwhile, in addition to the handover procedure described above, the concept of the present invention proposed above may also be applied to N2 release procedure, and also applied to AMF/SMF interaction.

FIG. 25 is a diagram illustrating N2 release procedure according to an embodiment of the present invention.

1. When a RAN (i.e., gNB) detects inactivity of a UE, the RAN requests N2 release to an AMF. For example, the RAN may transmit an N2 UE Context Release Request message.

At this time, the RAN may transmit an identity (e.g., S-TMSI) of the corresponding UE and an active PDU Session ID list with being included in the N2 UE Context Release Request message.

2. The AMF transmits an SM message (e.g., SM request message) to the SMF associated with a Session ID included in the N2 UE Context Release Request message.

That is, in the case that the RAN includes Session IDs 1 and 2, the AMF does not transmit the SM message to all SMFs in which a PDU session is setup with the AMF, but transmits the SM message only to the SMF which is associated with Session IDs 1 and 2.

At this time, the SM message may include a cause value (e.g., release session) and a session ID of a PDU session that requests deactivation.

3~4. The SMF performs N2 interface release procedure. That is, the SMF transmits a Session Modification Request message to a UPF, and in response to it, receives a Session Modification Response message. After completing this procedure, the corresponding PDU session is deactivated in the SMF.

5. The SMF transmits the SM message (e.g., SM request ack message) for PDU deactivation to the AMF.

6. When the AMF receives all SM messages (e.g., SM request ack) in response to the SM message (i.e., SM request) that the AMF itself transmitted, the AMF transmits an N2 UE Context Release Command message to the RAN.

7~8. The RAN releases all RRC connections with the UE, and transmits an N2 UE context release complete message to the AMF.

Through such an operation, the AMF may perform N2 release (i.e., PDU session deactivation) operation for the PDU session in which a session is activated, while not managing the activated context of the PDU session.

FIG. 26 is a diagram illustrating a method for managing a PDU session according to an embodiment of the present invention.

Referring to FIG. 26, a source RAN (i.e., source gNB) may determine to initiate handover (e.g., N2 based handover) to a target RAN (i.e., target gNB) due to the mobility of a UE or the RAN may detect inactivity of the UE and may determine initiate the N2 release procedure (step, S2601).

This step may correspond to step 1 of FIG. 24 or step 1 of FIG. 25.

The source RAN may transmit a Handover Required message to an AMF (in the case that the RAN determines handover in step S2601) or transmit a UE Context Release Request message to the AMF (in the case that the RAN determines N2 release procedure in step S2601) (step, S2602).

This step may correspond to step 2 of FIG. 24 or step 1b of FIG. 25.

At this time, the Handover Required message or the UE Context Release Request message may include a PDU session ID of the activated PDU session. In this case, the activated PDU session may mean a PDU session that has an activated user plane connection. In addition, the PDU session that has an activated user plane connection may mean a PDU session in which Data Radio Bearer between the RAN and the UE and N3 interface tunnel between the RAN and a UPF are established.

In addition, all of the PDU sessions processed by the source RAN may correspond to activated PDU session. In this case, the source RAN may include the PDU session IDs for all PDU session processed by the source RAN in the Handover Required message.

As such, the PDU session ID included in the Handover Required message may indicate that handover of the PDU session corresponding to the PDU session ID is requested by the source RAN.

The contents of the Handover Required message may be constructed as Table 2, and more detailed description for it will be omitted.

The AMF transmits a Session Management (SM) message (e.g., SM Request message) to the SMF associated for each PDU session which is indicated by the PDU session ID received in the Handover Required message or the UE Context Release Request message (step, S2603).

This step may correspond to step 3 of FIG. 24 or step 2 of FIG. 25.

The AMF may store an association between the PDU session ID and an SMF ID. Based on the association information, the AMF may determine the SMF associated for each PDU session ID which is received from the source RAN. Further, the AMF may transmit the SM message for the PDU session associated with the corresponding SMF.

Later, the procedure illustrated in FIG. 24 (from step 4) or the procedure illustrated in FIG. 25 (from step 3) may be performed.

Overview of Devices to which the Present Invention can be Applied

FIG. 27 illustrates a block diagram of a communication device according to one embodiment of the present invention.

With reference to FIG. 27, a wireless communication system comprises a network node 2710 and a plurality of UEs 2720.

A network node 2710 comprises a processor 2711, memory 2712, and communication module 2713. The processor 2711 implements proposed functions, processes and/or methods proposed through FIG. 1 to FIG. 26. The processor 2711 can implement layers of wired/wireless interface protocol. The memory 2712, being connected to the processor 2711, stores various types of information for driving the processor 2711. The communication module 2713, being connected to the processor 2711, transmits and/or receives wired/wireless signals. Examples of the network node 2710 include an eNB(gNB), AMF, SMF, UPF, AUSF, NEF, NRF, PCF, UDM, AF, DN and so on. In particular, in case the network node 2710 is an eNB, the communication module 2713 can include a Radio Frequency (RF) unit for transmitting/receiving a radio signal.

The UE 2720 comprises a processor 2721, memory 2722, and communication module (or RF unit) 2723. The processor 2721 implements proposed functions, processes and/or methods proposed through FIG. 1 to FIG. 26. The processor 2721 can implement layers of wired/wireless interface protocol. The memory 2722, being connected to the processor 2721, stores various types of information for driving the processor 2721. The communication module 2723, being connected to the processor 2721, transmits and/or receives wired/wireless signals.

The memory 2712, 2722 can be installed inside or outside the processor 2711, 2721 and can be connected to the processor 2711, 2721 through various well-known means.

Also, the network node 2710 (in the case of an eNB) and/or the UE 2720 can have a single antenna or multiple antennas.

FIG. 28 illustrates a block diagram of a wireless communication apparatus according to an embodiment of the present invention.

Particularly, in FIG. 28, the UE described above FIG. 27 will be exemplified in more detail.

Referring to FIG. 28, the UE includes a processor (or digital signal processor) 2810, RF module (RF unit) 2835, power management module 2805, antenna 2840, battery 2855, display 2815, keypad 2820, memory 2830, Subscriber Identification Module (SIM) card 2825 (which may be optional), speaker 2845 and microphone 2850. The UE may include a single antenna or multiple antennas.

The processor 2810 may be configured to implement the functions, procedures and/or methods proposed by the present invention as described in FIG. 1-26. Layers of a wireless interface protocol may be implemented by the processor 2810.

The memory 2830 is connected to the processor 2810 and stores information related to operations of the processor 2810. The memory 2830 may be located inside or outside the processor 2810 and may be connected to the processors 2810 through various well-known means.

A user enters instructional information, such as a telephone number, for example, by pushing the buttons of a keypad 2820 or by voice activation using the microphone 2850. The microprocessor 2810 receives and processes the instructional information to perform the appropriate function, such as to dial the telephone number. Operational data may be retrieved from the SIM card 2825 or the memory module 2830 to perform the function. Furthermore, the processor 2810 may display the instructional and operational information on the display 2815 for the user's reference and convenience.

The RF module 2835 is connected to the processor 2810, transmits and/or receives an RF signal. The processor 2810 issues instructional information to the RF module 2835, to initiate communication, for example, transmits radio signals comprising voice communication data. The RF module 2835 comprises a receiver and a transmitter to receive and transmit radio signals. An antenna 2840 facilitates the transmission and reception of radio signals. Upon receiving radio signals, the RF module 2835 may forward and convert the signals to baseband frequency for processing by the processor 2810. The processed signals would be transformed into audible or readable information outputted via the speaker 2845.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A and 5G systems is primarily described, but can be applied to various wireless communication systems in addition to the 3GPP LTE/LTE-A and 5G systems.

What is claimed is:

1. A method performed by a source radio access network (RAN) in a wireless communication system, the method comprising:
    performing a procedure for connection release with a user equipment (UE);
    transmitting, to a first network node, a N2 UE context release request message based on inactivity of the UE;
    receiving, from the first network node, a N2 UE context release command message; and
    transmitting, to the first network node, a N2 UE context release complete message;
    wherein the N2 UE context release request message includes an identifier (ID) of the UE and a list of at least one packet data unit (PDU) session ID that is activated, and
    wherein a first signaling between the first network node and a second network node and a second signaling between the second network node and a third network node are performed in response to the list of the at least one PDU session ID being included in the N2 UE context release request message.

2. The method of claim 1, wherein the first network node comprises an access and mobility management function (AMF),
    wherein the second network node comprises a session management function (SMF), and
    wherein the third network node comprises a user plane function (UPF).

3. The method of claim 1, wherein the first signaling includes,
    transmitting, by the first network node, to the second network node, a session management request message;
    transmitting, by the second network node, to the first network node, a session management acknowledge message,
    wherein the session management request message includes at least one of information related to a cause or information related to a PDU session ID.

4. The method of claim 1, wherein the second signaling includes,
    transmitting, by the second network node, to the third network node, a session modification request message; and
    transmitting, by the third network node, to the second network node, a session modification response message.

5. A radio access network (RAN) in a wireless communication system, the RAN comprising:
    at least one transceiver; and
    at least one processor coupled to the at least one transceiver and configured to:
    perform a procedure for connection release with a user equipment (UE);
    transmit, to a first network node, a N2 UE context release request message based on inactivity of the UE;
    receive, from the first network node, a N2 UE context release command message; and
    transmit, to the first network node, a N2 UE context release complete message;
    wherein the N2 UE context release request message includes an identifier (ID) of the UE and a list of at least one packet data unit (PDU) session ID that is activated, and
    wherein a first signaling between the first network node and a second network node and a second signaling between the second network node and a third network node are performed in response to the list of the at least one PDU session ID being included in the N2 UE context release request message.

6. The RAN of claim 5, wherein the first network node comprises an access and mobility management function (AMF),
    wherein the second network node comprises a session management function (SMF), and
    wherein the third network node comprises a user plane function (UPF).

7. The RAN of claim 5, wherein the first signaling includes,
    transmitting, by the first network node, to the second network node, a session management request message;
    transmitting, by the second network node, to the first network node, a session management acknowledge message,
    wherein the session management request message includes at least one of information related to a cause or information related to a PDU session ID.

8. The RAN of claim 5, wherein the second signaling includes,
    transmitting, by the second network node, to the third network node, a session modification request message; and
    transmitting, by the third network node, to the second network node, a session modification response message.

9. A communication apparatus comprising:
    at least one processor; and
    at least one computer memory operably connected to the at least one processor and storing instructions that, based on being executed by the at least one processor, perform operations comprising:
    performing a procedure for connection release with a user equipment (UE);

transmitting, to a first network node, a N2 UE context release request message;
receiving, from the first network node, a N2 UE context release command message; and
transmitting, to the first network node, a N2 UE context release complete message based on inactivity of the UE;
wherein the N2 UE context release request message includes an identifier (ID) of the UE and a list of at least one packet data unit (PDU) session ID that is activated, and
wherein a first signaling between the first network node and a second network node and a second signaling between the second network node and a third network node are performed in response to the list of the at least one PDU session ID being included in the N2 UE context release request message.

10. The method of claim 1, wherein the first signaling includes, transmitting or receiving a message including at least one of information related to a cause or information related to a PDU session ID.

\* \* \* \* \*